(12) United States Patent
Yaakoby

(10) Patent No.: US 10,968,821 B2
(45) Date of Patent: Apr. 6, 2021

(54) PISTON ROD AND FREE PISTON ENGINE

(71) Applicant: Aquarius Engines (A.M.) Ltd., Rosh Haayin (IL)

(72) Inventor: Shaul Haim Yaakoby, Alsdorf (DE)

(73) Assignee: Aquarius Engines (A.M.) Ltd., Rosh Haayin (IL)

( * ) Notice: Subject to any disclaimer, the term of this patent is extended or adjusted under 35 U.S.C. 154(b) by 0 days.

(21) Appl. No.: 16/831,920

(22) Filed: Mar. 27, 2020

(65) Prior Publication Data

US 2020/0224585 A1 Jul. 16, 2020

Related U.S. Application Data

(63) Continuation of application No. 16/207,479, filed on Dec. 3, 2018, now Pat. No. 10,641,166.

(51) Int. Cl.
*F02B 71/00* (2006.01)
*F16J 1/12* (2006.01)
*F16J 7/00* (2006.01)

(52) U.S. Cl.
CPC ............... *F02B 71/00* (2013.01); *F16J 1/12* (2013.01); *F16J 7/00* (2013.01)

(58) Field of Classification Search
CPC ........ F02B 71/00; F02B 71/04; F02B 71/045; F02B 71/06; F02B 33/14; F02B 41/00;
(Continued)

(56) References Cited

U.S. PATENT DOCUMENTS

| 1,040,472 A | 10/1912 | Wade |
| 1,707,035 A | 3/1929 | Wurfel |

(Continued)

FOREIGN PATENT DOCUMENTS

| DE | 3149930 A1 | 8/1982 |
| DE | 3347859 A1 | 6/1985 |

(Continued)

OTHER PUBLICATIONS

Extended European search report in Application No. 16823945.7-1004/3322884 PCT/IB2016001189 dated Jan. 24, 2019.
(Continued)

*Primary Examiner* — George C Jin
(74) *Attorney, Agent, or Firm* — Finnegan, Henderson, Farabow, Garrett & Dunner, LLP

(57) ABSTRACT

An internal combustion engine may include an engine block, a cylinder defining at least one combustion chamber, and a piston in the cylinder. The piston may travel in a first stroke from one end to an opposite end of the cylinder, and may be sized relative to the cylinder to enable an expansion stroke portion of the first stroke while the piston travels under gas expansion pressure, and a momentum stroke portion of the first stroke for the remainder of the first stroke following the expansion stroke portion. A passageway may be formed in the piston rod to communicate gas flow between a first combustion chamber and an area external to the cylinder when the piston is in a first position, and to communicate gas flow between a second combustion chamber and an area external to the cylinder when the piston is in a second position.

20 Claims, 15 Drawing Sheets

(58) Field of Classification Search
CPC .. F02B 75/002; F02B 75/16; F16J 7/00; F16J 1/12; F01B 11/001; F02M 35/1015; F02F 1/00; F02F 1/06; F02F 3/0015; F01N 13/10

See application file for complete search history.

(56) References Cited

U.S. PATENT DOCUMENTS

| | | | |
|---|---|---|---|
| 1,720,504 A | 7/1929 | Williams |
| 1,755,673 A | 4/1930 | Solenberger |
| 1,764,815 A | 6/1930 | Williams |
| 1,796,882 A | 3/1931 | Bowers |
| 2,028,331 A | 1/1936 | Janicke |
| 2,187,979 A | 1/1940 | Malpas |
| 2,392,052 A | 1/1946 | Matheisel |
| 2,399,683 A | 5/1946 | Loeb |
| 2,407,790 A | 9/1946 | Le Tourneau |
| 2,831,738 A | 4/1958 | Marien |
| 2,874,012 A | 2/1959 | Stern |
| 3,146,940 A | 9/1964 | McCrory et al. |
| 3,358,656 A | 12/1967 | Panhard |
| 3,365,879 A | 1/1968 | Panhard |
| 3,369,733 A | 2/1968 | Campbell |
| 3,465,161 A | 9/1969 | Cutkosky |
| 3,610,217 A | 10/1971 | Braun |
| 3,791,227 A | 2/1974 | Cherry |
| 3,797,466 A | 3/1974 | Nambu |
| 3,914,574 A | 10/1975 | Hill et al. |
| 4,156,410 A | 5/1979 | Ramsey |
| 4,385,597 A | 5/1983 | Stelzer |
| 4,414,927 A | 11/1983 | Simon |
| 4,489,554 A | 12/1984 | Otters |
| 4,653,274 A | 3/1987 | David |
| 4,658,768 A | 4/1987 | Carson |
| 4,803,960 A | 2/1989 | Köppen |
| 4,831,972 A | 5/1989 | Barnwell |
| 4,854,218 A | 8/1989 | Stoll |
| 4,876,991 A | 10/1989 | Galitello, Jr. |
| 5,123,245 A | 6/1992 | Vilenius et al. |
| 5,158,046 A | 10/1992 | Rucker |
| 5,285,752 A | 2/1994 | Reed et al. |
| 5,351,659 A | 10/1994 | Chao |
| 5,676,097 A | 10/1997 | Montresor |
| 5,710,514 A | 1/1998 | Crayton et al. |
| 5,816,202 A | 10/1998 | Montresor |
| 6,035,637 A | 3/2000 | Beale et al. |
| 6,065,438 A | 5/2000 | Kiesel |
| 6,164,250 A | 12/2000 | Bailey et al. |
| 6,170,442 B1 | 1/2001 | Beale |
| 6,199,519 B1 | 3/2001 | Van Blarigan |
| 6,240,828 B1 | 6/2001 | Fujimoto |
| 6,298,941 B1 | 10/2001 | Spadafora |
| 6,467,397 B1 | 10/2002 | Fuchs et al. |
| 6,722,322 B2 | 4/2004 | Tse |
| 6,948,459 B1 | 9/2005 | Laumen et al. |
| 7,032,548 B2 | 4/2006 | Tusinean |
| 7,194,989 B2 | 3/2007 | Hallenbeck |
| 7,207,299 B2 | 4/2007 | Hofbauer |
| 7,318,506 B1 | 1/2008 | Meic |
| 7,412,949 B1 | 8/2008 | Cillessen et al. |
| 9,010,287 B2 | 4/2015 | Morreim |
| 9,206,900 B2 | 12/2015 | Smith et al. |
| 2002/0189433 A1 | 12/2002 | Unger et al. |
| 2004/0244765 A1 | 12/2004 | Elmer |
| 2005/0284426 A1 | 12/2005 | Tusinean |
| 2006/0157003 A1 | 7/2006 | Lemke et al. |
| 2006/0232268 A1 | 10/2006 | Arns, Jr. et al. |
| 2007/0017684 A1 | 1/2007 | Stirm et al. |
| 2008/0251050 A1 | 10/2008 | Jacobsen et al. |
| 2009/0114391 A1 | 5/2009 | Smith, IV et al. |
| 2011/0073419 A1 | 3/2011 | Matsuzaki et al. |
| 2011/0239642 A1 | 10/2011 | Schwiesow et al. |
| 2012/0160190 A1 | 6/2012 | Klöpzig |
| 2012/0192438 A1 | 8/2012 | Aoki et al. |
| 2012/0266842 A1 | 10/2012 | Cockerill |
| 2012/0280513 A1 | 11/2012 | Cockerill |
| 2013/0276740 A1 | 10/2013 | Wandrie et al. |
| 2013/0298874 A1 | 11/2013 | Sun et al. |
| 2014/0116389 A1 | 5/2014 | Khurgin |
| 2015/0114352 A1 | 4/2015 | McAlister et al. |
| 2016/0208686 A1 | 7/2016 | Gadda et al. |
| 2017/0016327 A1 | 1/2017 | Yaakoby |
| 2017/0044975 A1 | 2/2017 | Yaakoby |
| 2018/0106215 A1* | 4/2018 | Svrcek ................. F16J 1/09 |

FOREIGN PATENT DOCUMENTS

| | | |
|---|---|---|
| DE | 3518982 A1 | 11/1986 |
| DE | 4136331 A1 | 5/1992 |
| DE | 4447040 C1 | 5/1996 |
| DE | 20 2006018097 U1 | 6/2008 |
| DE | 102008004879 A1 | 7/2009 |
| FR | 1 437 474 A | 5/1996 |
| GB | 337248 | 10/1930 |
| GB | 602310 A | 5/1948 |
| GB | 2183726 A | 6/1987 |
| GB | 2232718 A | 12/1990 |
| GB | 2353562 A | 2/2001 |
| JP | S6238833 A | 2/1987 |
| JP | 63-192916 | 10/1988 |
| RU | 2 500 905 C1 | 12/2013 |
| WO | WO 2015/155912 A1 | 10/2015 |

OTHER PUBLICATIONS

European examination report in Application No. 15782938.3-1004 dated Oct. 24, 2019.

Jan Ridders, "Dual 2stroke model engine," available at URL: https://www.youtube.com/watch?v=gLwHEUJ752s, uploaded May 22, 2013.

* cited by examiner

US 10,968,821 B2

PISTON ROD AND FREE PISTON ENGINE

RELATED APPLICATIONS

This application is a continuation application of and claims the benefit of priority from U.S. patent application Ser. No. 16/207,479, filed Dec. 3, 2018, entitled "Piston Rod and Free Piston Engine," the contents of which is incorporated herein by reference in its entirety.

TECHNICAL FIELD

The present disclosure relates to the field of internal combustion engines, and more particularly to the field of internal combustion engines having a free piston.

BACKGROUND

Internal combustion engines are known. The most common types of piston engines are two-stroke engines and four-stroke engines. These types of engines include a relatively large number of parts, and require numerous auxiliary systems, e.g., lubricant systems, cooling systems, intake and exhaust valve control systems, and the like, for proper functioning.

SUMMARY

Some embodiments may relate to a linear reciprocating engine. The linear reciprocating engine may include an internal combustion engine. The internal combustion engine may include a cylinder having a first combustion chamber at a first end thereof and a second combustion chamber at an opposing second end thereof, a piston slidably mounted within the cylinder, and a piston rod having a passageway extending through the piston into both combustion chambers. There may be provided at least one first opening in a first side of the piston rod configured to move into and out of the first combustion chamber to selectively communicate gas to the first combustion chamber, and at least one second opening in a second side of the piston rod configured to move into and out of the second combustion chamber to selectively communicate gas to the second combustion chamber. The piston may be slidable between a first position where the first opening is outside the first combustion chamber and the second opening is inside the second combustion chamber, and a second position where the first opening is inside the first combustion chamber and the second opening is outside the second combustion chamber.

According to some embodiments, an engine may be provided that enables gas to be communicated to each of two combustion chambers at separate times. Gas may be constantly supplied to flow through the passageway in the piston rod, while the gas is allowed to enter the cylinder only when an opening among the first openings and second opening is in communication with the cylinder. The first opening may include one or more openings, and the second opening may include one or more openings. Gas may travel through the piston rod to supply both of the combustion chambers appropriately during the various phases of the stroke of the engine.

Exemplary advantages and effects of the present invention will become apparent from the following description taken in conjunction with the accompanying drawings wherein certain embodiments are set forth by way of illustration and example. The examples described herein are just a few exemplary aspects of the disclosure. It is to be understood that both the foregoing general description and the following detailed description are exemplary and explanatory only and are not restrictive of the invention.

DETAILED DESCRIPTION

The present disclosure relates to internal combustion engines. While the present disclosure provides examples of free piston engines, it should be noted that aspects of the disclosure in their broadest sense, are not limited to a free piston engine. Rather, it is contemplated that the forgoing principles may be applied to other internal combustion engines as well.

As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

An internal combustion engine in accordance with the present disclosure may include an engine block. The term "engine block," also used synonymously with the term "cylinder block," may include an integrated structure that includes at least one cylinder housing a piston. In the case of a free piston engine block, the engine block may include a single cylinder, or it may include multiple cylinders.

In accordance with the present disclosure, a cylinder may define at least one combustion chamber in the engine block. In some internal combustion engines in accordance with the present disclosure, a combustion chamber may be located on a single side of a cylinder within an engine block. In some internal combustion engines in accordance with the present disclosure, the internal combustion engine may include two combustion chambers, one on each side of a cylinder within an engine block.

Embodiments of the present disclosure may further include a piston in the cylinder. In accordance with some embodiments of the disclosure used in a free piston engine, the piston may include two heads on opposite sides. In some embodiments, the piston may be considered to be "slidably mounted" in the cylinder. This refers to the fact that the piston may slide through a plurality of positions in the cylinder from one side of the cylinder to the other. While the present disclosure describes piston examples, the invention in its broadest sense is not limited to a particular piston configuration or construction.

Figure 1:
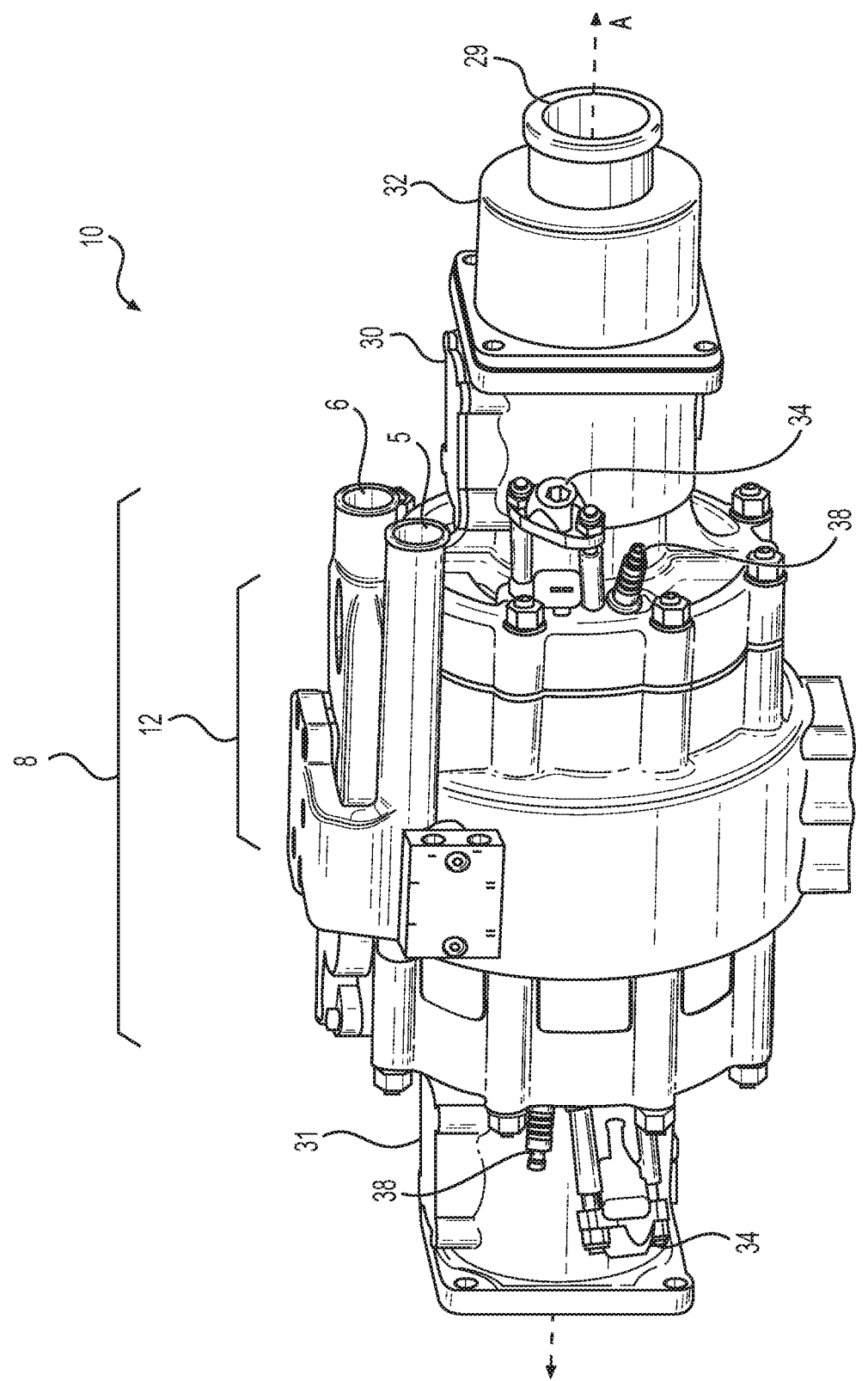
FIG. 1 is a perspective view of a free piston engine, in accordance with embodiments of the present disclosure.
Figure 2:
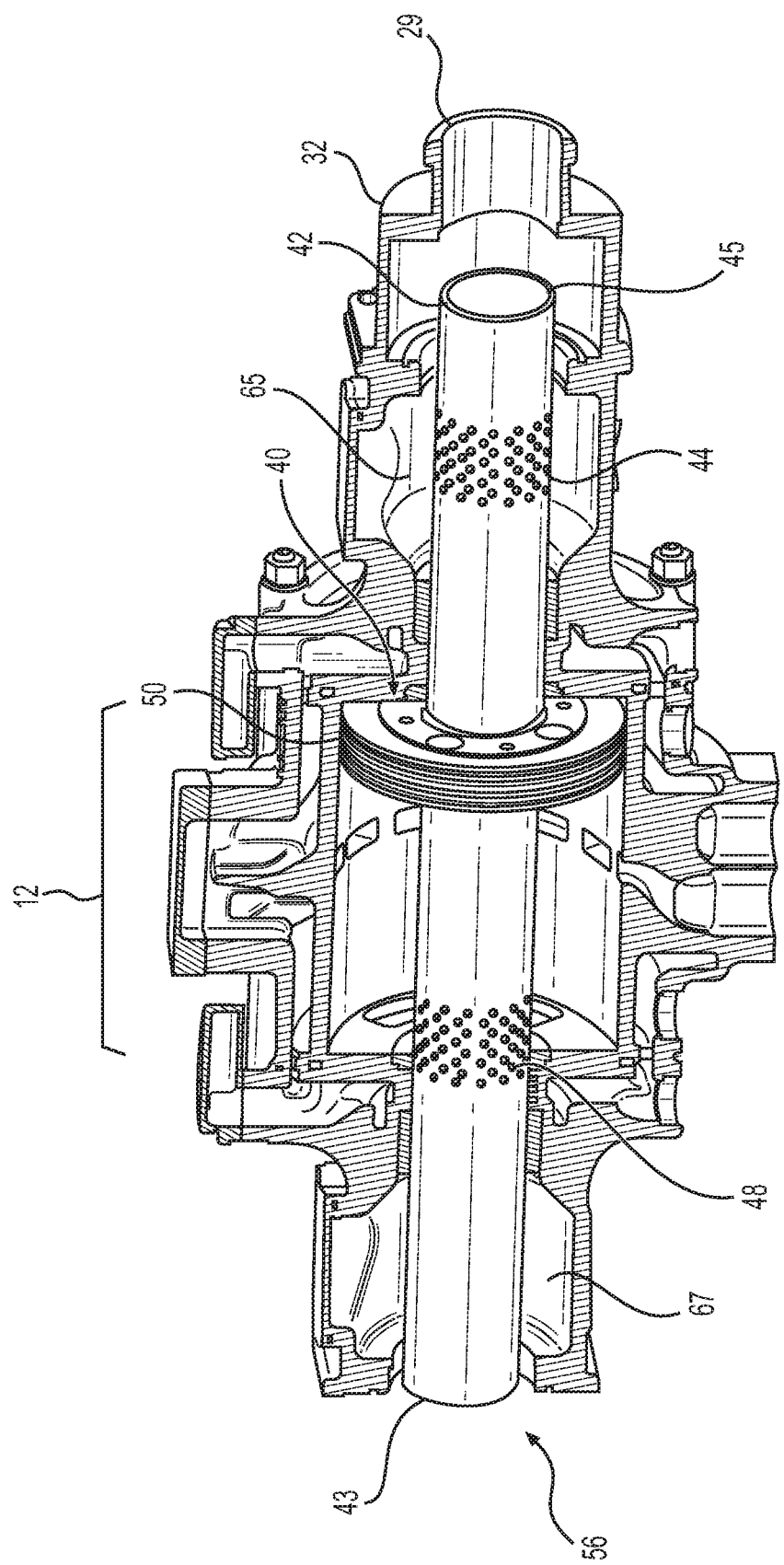
FIG. 2 is a perspective partial cross-sectional view of the engine of FIG. 1 with the piston at top dead center on a right side of the cylinder, in accordance with embodiments of the present disclosure.
Figure 3:
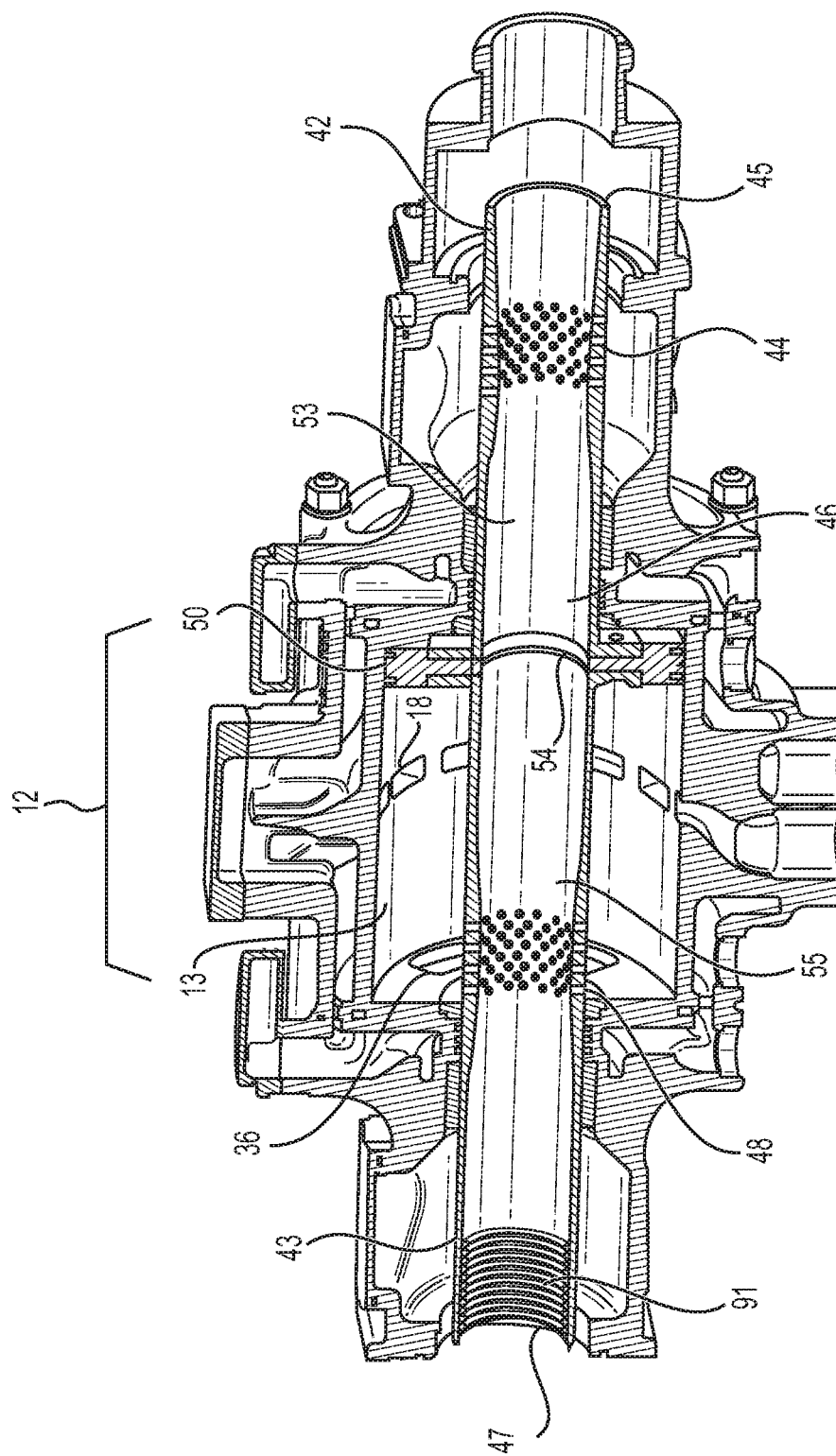
FIG. 3 is a perspective cross-sectional view of the engine of FIG. 1, in accordance with embodiments of the present disclosure.

FIG. 1 illustrates an exemplary embodiment of a free piston engine 10 according to the present disclosure. Free piston engine 10, which is sometimes referred to herein simply as an engine, is one example of an internal combustion engine. Free piston engine 10 includes an engine block 8. A cylinder 12 defining at least one combustion chamber may be included in engine block 8 and may have a central, longitudinal axis A, and, as shown in FIG. 2, a double-faced piston 50 mounted in cylinder 12. Piston 50 may be configured to travel in a first stroke from a first end of the cylinder to an opposite second end of the cylinder, and in a second stroke from the second end of the cylinder back to the first end of the cylinder. FIG. 2 illustrates a cutaway view showing a perspective partial cross-sectional view of the engine of FIG. 1. FIG. 3 illustrates a perspective cross-sectional view, including a cross-sectional view of piston 50. FIGS. 5-10 illustrate an exemplary movement of piston 50 from a first end of the cylinder to a second end of the cylinder. At least one piston rod portion may be connected to the piston rod and may extend from a location within the at least one combustion chamber to an area external to the cylinder. As used herein, the term "piston rod portion" includes any portion of a rod or shaft, extending from a piston. In some embodiments, a piston rod portion may be a portion of a monolithic structure that makes up the piston, as well as other components. In some embodiments, a piston rod portion may be a portion of a piston rod that extends from only one face of a piston.

By way of example, as shown in FIGS. 2 and 3, a piston rod 40 may include a first piston rod portion 42 and a second piston rod portion 43. First piston rod portion 42 may extend from one face of piston 50. First piston rod portion 42 may extend from a location within the at least one combustion chamber to an area 65 external to the cylinder. Similarly, second piston rod portion 43 may extend from an opposite face of piston 50, to another area 67 external to cylinder 12. A piston kit may include first piston rod portion 42, second piston rod portion 43, and piston 50. Piston rod portions 42 and 43 may be monolithic with each other, or may be completely separate structures, each extending from an opposite side or face of piston 50. For example, piston kit 56 may be formed from a single piece of material. Piston rod 40 may be monolithic with piston 50. In some embodiments, first piston rod portion 42 and second piston rod portion 43 may be monolithic with each other while being separate from piston 50.

Figure 7:
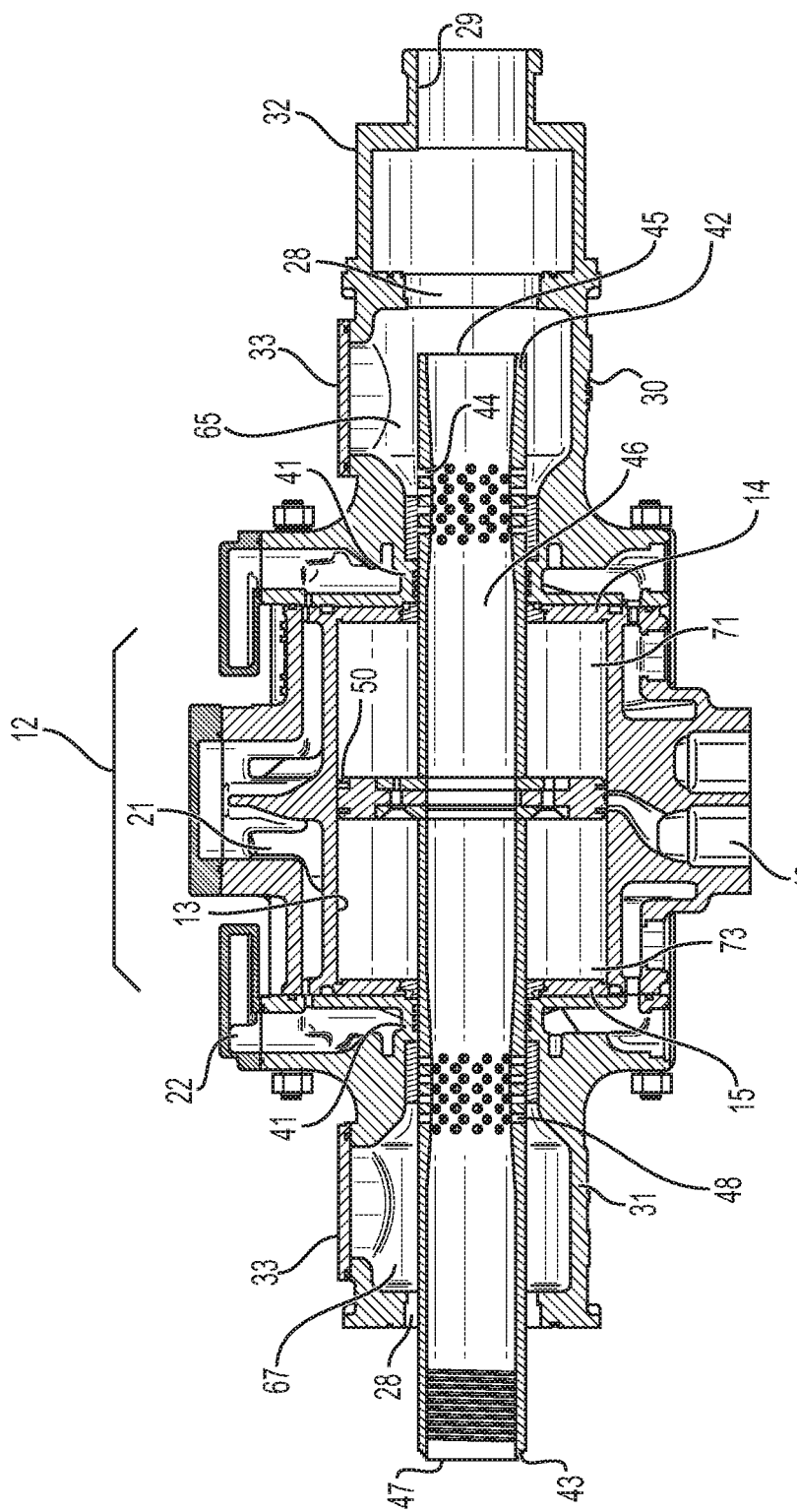
FIG. 7 is a cross-sectional view of the engine of FIG. 1 with the piston at the end of the expansion portion of the stroke from the right side of the cylinder to the left side of the cylinder, in accordance with embodiments of the present disclosure.

Cylinder 12 may include a first combustion chamber 71 and a second combustion chamber 73 (see FIG. 7). Piston 50 may be configured to slide along axis A. In various positions within cylinder 12, there may be a fluid communication path that connects first combustion chamber 71 with an air supply, or that connects second combustion chamber 73 with an air supply.

Figure 5:
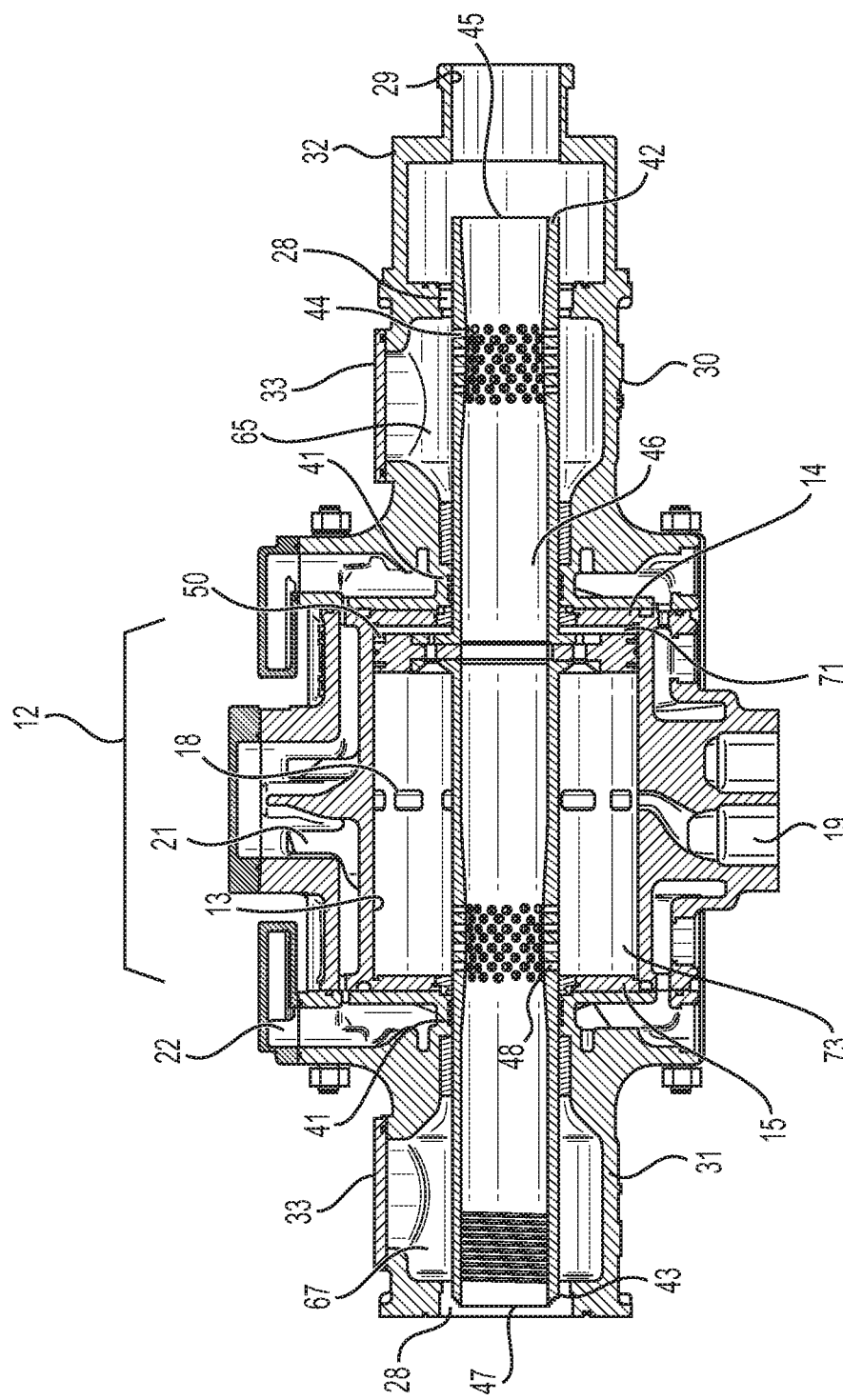
FIG. 5 is a cross-sectional view of the engine of FIG. 1 with the piston at top dead center on the right side of the cylinder, in accordance with embodiments of the present disclosure.

Reference is now made to FIG. 5, which illustrates a side cross-sectional view of engine 10. An area external to cylinder 12 (e.g., areas 65 and 67) may include a vestibule at each end of the cylinder that may be a space configured for supplying gas, such as air, to each of the combustion chambers at the opposite ends of the cylinder from one or more sources of the gases external to the cylinder. For example, FIG. 5 shows a first vestibule 30 and a second vestibule 31. First vestibule 30 is exterior to cylinder 12 and thus exterior to first combustion chamber 71, and second vestibule 31 is exterior to cylinder 12 and thus exterior to second combustion chamber 73. The vestibules may be contained by a portion of the structure forming engine block 8 or may be formed by a separate structure connected to engine block 8. The vestibules may be connected to an inlet manifold (not shown) that supplies gas. A passageway 46 that may be a part of piston rod 40 may be configured to deliver gas from first vestibule 30 to cylinder 12, including first combustion chamber 71. In some embodiments, passageway 46 may be configured to deliver gas from second vestibule 31 to cylinder 12, including second combustion chamber 73.

Cylinder 12 may include a peripheral cylinder wall 13 and exhaust ports 18 in peripheral cylinder wall 13. In some embodiments, exhaust ports 18 may consist of a single port. Exhaust ports 18 may be connected to an exhaust manifold configured for receiving exhaust gases or other gases from the combustion chambers and directing the gases away from the cylinder for exhaust aftertreatment. In the manner discussed above, for example, a passageway of the piston rod may be configured to introduce gas into a combustion chamber from a location outside the cylinder. Also, gases may exit the cylinder through an exhaust port, such as exhaust ports 18. In an embodiment, areas 65 and 67 external to cylinder 12 may simply refer to any region on an opposite side of a cylinder head 14, 15 from cylinder 12, regardless of whether the region is in direct contact with a cylinder head. In some embodiments, other ports may be provided to introduce gases from a manifold or other source located alongside the cylinder, rather than at ends of the cylinder. Thus, in a general sense, locations outside the cylinder may be at the ends of the cylinder, alongside the cylinder, or a combination of both, for example.

In accordance with embodiments of the disclosure, a piston rod may include a passageway configured to communicate gas flow between at least one combustion chamber and an area external to the cylinder. As used herein, the term "passageway" can be defined by any structure or void capable of communicating gas flow. It may include, for example, a channel or conduit completely or partially contained within at least part of the piston rod portion.

For example, in some exemplary embodiments of an engine according to the disclosure, the passageway in the piston rod may render piston rod 40, including piston rod portions 42 and 43, at least partially hollow. In some embodiments, the passageway may extend completely through piston 50. An opening may be formed in one or each piston rod portion that may be in fluid communication with the passageway of the piston rod, to thereby permit fluid to enter or exit the passageway through the opening. It is understood that a "fluid" may include gas, such as air. As shown in FIG. 2, first piston rod portion 42 may include opening 45. Opening 45 may be arranged at the end of first piston rod portion 42 opposite piston 50, which may be an open end. Piston rod portion 43 may also include an opening 47 (see FIG. 3). In some embodiments, opening 47 may be occluded. For example, piston rod portion 43 may include a plug 49 that may be screwed into an open end of piston rod portion 43 opposite piston 50.

Figure 4A:
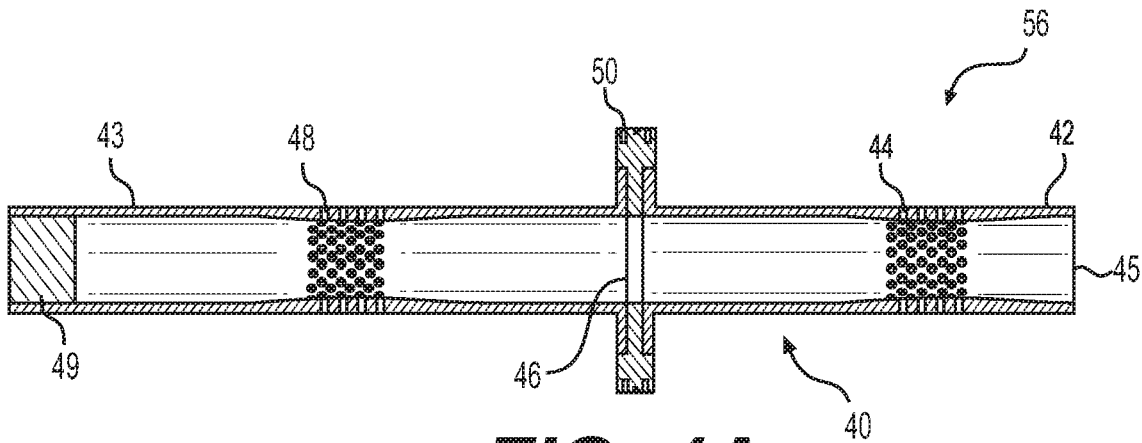
FIGS. 4A-4C are views of a piston kit, in accordance with embodiments of the present disclosure.

FIG. 4A shows a cross-sectional view of piston kit 56. Piston kit 56 may include one piston, such as piston 50, and a piston rod 40 that may include two piston rod portions, such as first piston rod portion 42 and second piston rod portion 43. Piston kit 56 may include passageway 46 extending through piston 50 into both combustion chambers 71 and 73. That is, piston kit 56 may include a passageway that extends through piston 50 and further extends beyond a first face of piston 50 and extends beyond a second face of piston 50 opposite to the first face. Furthermore, piston kit 56 may include plug 49. Plug 49 may be configured to occlude one end of piston rod 40. For example, FIG. 4A shows plug 49 screwed into threads in second piston rod portion 43 to occlude opening 47. Plug 49 may seal opening 47 in an air-tight manner. Therefore, air introduced into piston rod 40 through opening 45 may be forced to exit piston rod 40 through either first opening 44 or second opening 48. First opening 44, second opening 48, and opening 45 may be in fluid communication through passageway 46.

Figure 4B:
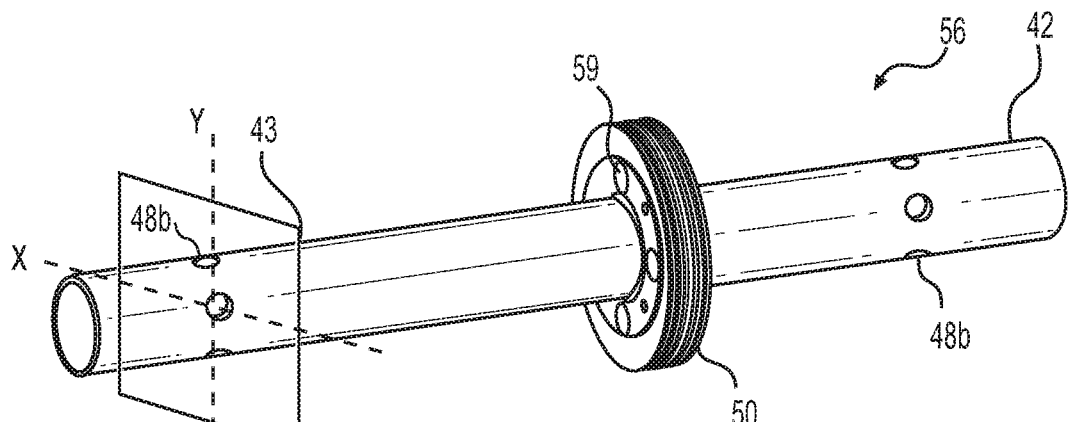

FIG. 4B shows another view of piston kit 56. Components of piston kit 56 may be fastened to one another in a fixed manner. Piston 50 and piston rod 40 may be formed separately from one another and may be fastened by a fastener. For example, screws 59 may be provided that fasten first piston rod portion 42, piston 50, and second piston rod portion 43 to one another. Furthermore, in some embodiments, first opening 44 and second opening 48 may each include a set of holes aligned at an axial position of piston rod 40. For example, as shown in FIG. 4B, second opening 48b on second piston rod 43 may include a row of holes aligned with plane XY that is perpendicular to axis A. The holes may extend completely through the wall of second piston rod 43 so that gases may be communicated between passageway 46 and areas external to piston rod 40.

Figure 4C:
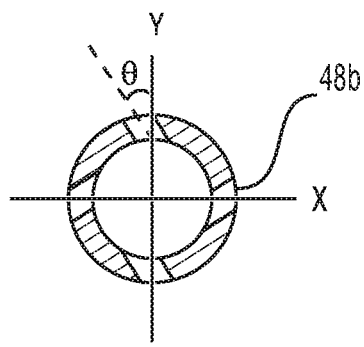

FIG. 4C is a cross-sectional view of second piston rod portion 43 taken at plane XY. In accordance with some embodiments, the holes may form an angle with a radial direction of piston rod 40. For example, the axis of a hole of second opening 48b may form an angle θ with the radial direction of piston rod 40. Sidewalls of holes may extend in a direction parallel to an axis, the axis being at an angle to the radial direction of piston rod 40. Axes of other holes among the holes of second opening 48b may form the same or different angles with the radial direction of piston rod 40. In some embodiments, angle θ may be less than or equal to 45 degrees. In some embodiments, angle θ may be in a range of 5 to 25 degrees. Openings having angled sidewalls may be useful for imparting or encouraging swirl on gas flows travelling through piston rod 40 and through second opening 48b. In some embodiments, there may be swirl vanes incorporated within piston rod 40. In addition to a circular hole, various other shapes may be employed for second opening 48b.

By way of example with reference to FIG. 3, each piston rod portion 42 and 43 may include a space 53, 55, respectively (e.g., hollowed out internal portions of piston rod portions 42 and 43), forming at least a part of a conduit configured to communicate gas flow between an interior of cylinder 12 and an area external to cylinder 12, such as areas 65 or 67. Piston 50 may also include a space 54 that forms a part of the conduit configured to communicate gas flow between the interior of cylinder 12 and external areas. Hollowed out regions may, for example, be a bore through a core of a piston rod portion or a piston. Spaces 53, 54, and 55 may be contiguous. Passageway 46 may include spaces 53, 54, and 55.

Figure 10:
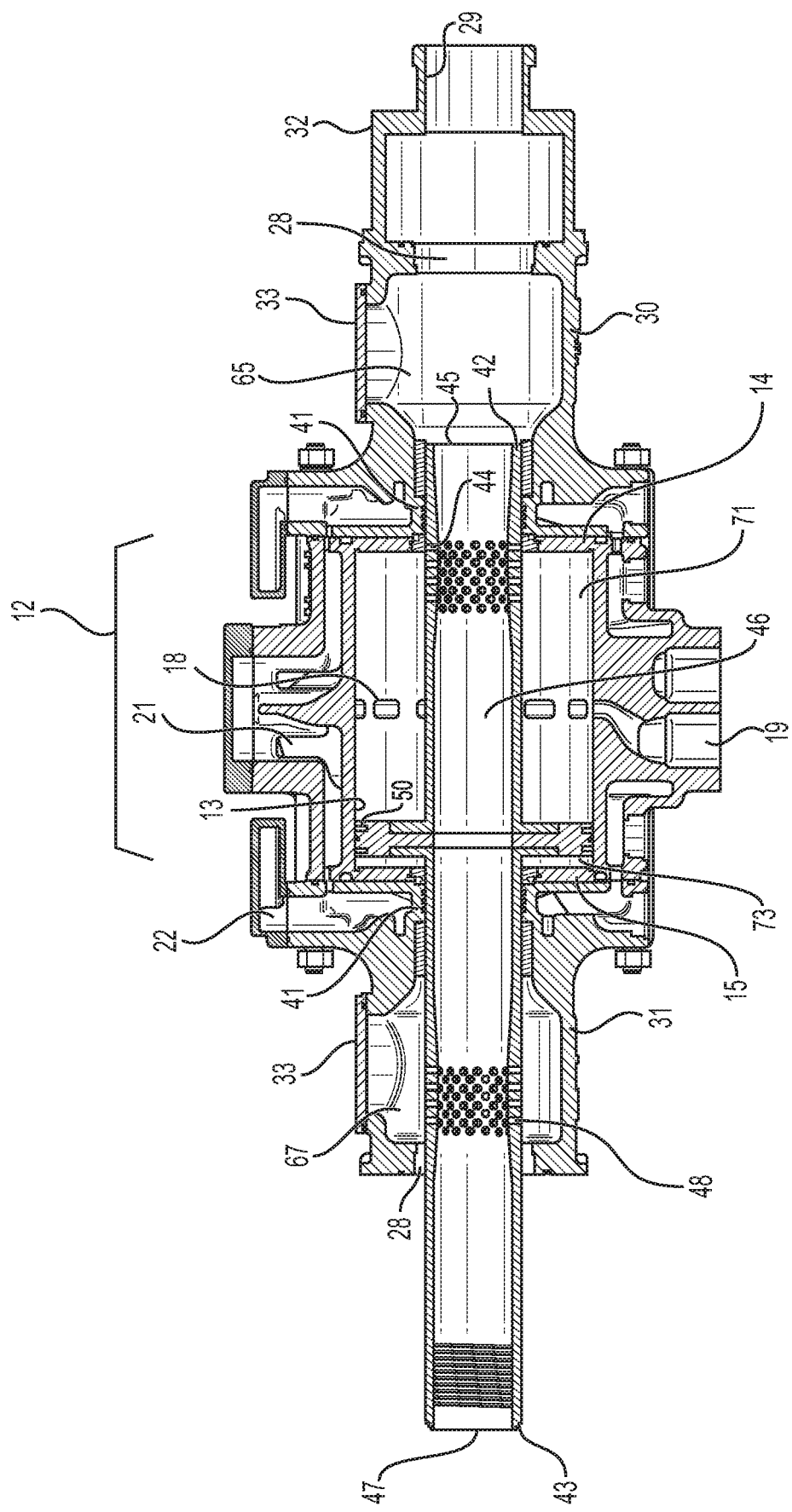
FIG. 10 is a cross-sectional view of the engine of FIG. 1 with the piston at top dead center on left side of the cylinder, in accordance with embodiments of the present disclosure.

As illustrated in FIG. 5, first combustion chamber 71 may be defined by a region between a side of piston 50 facing first head 14, and first head 14 of cylinder 12. Meanwhile, second combustion chamber 73 may be defined by a region between an opposite side of piston 50 that faces second head 15, and second head 15 of cylinder 12. Likewise, as illustrated in FIG. 10, second combustion chamber 73 at that time may be defined by a region between a side of piston 50 facing second head 15, and second head 15 of cylinder 12. Meanwhile, first combustion chamber 71 may be defined by a region between the side of piston 50 facing first head 14, and first head 14 of cylinder 12. For example, at a top dead center position at a respective end of cylinder 12, the combustion chamber at that time may be defined as the clearance volume. Similarly, the combustion chamber on the opposite side of the cylinder may be defined as the remaining open volume in cylinder 12. Of course, it is to be understood that each combustion chamber is a variable region that includes a swept volume on each side of the piston, and which is compressed as the piston moves from one end of the cylinder to the opposite end of the cylinder. A swept volume may be defined as the volume displaced by piston 50 during at least a part of its reciprocating motion in cylinder 12. Total volume of a cylinder may equal swept volume plus clearance volume.

Piston rod 40 may include at least one first opening, such as first opening 44 in a first side of piston rod 40, and at least one second opening, such as second opening 48 in a second side of piston rod 40, the second side being opposite the first side. In one exemplary embodiment, as shown in FIG. 5, for example, first opening 44 may include one or more ports in piston rod 40. First opening 44 may be configured to serve as an inlet for conveying gas into cylinder 12 via passageway 46. While an exemplary embodiment shown in FIG. 5 shows first opening 44 including a plurality of circular holes, a variety of shapes and arrangements may be used. For example, first opening 44 may include elongated slots, grooves, openings having angled sidewalls, and the like. As discussed above, FIG. 4C, which is a cross-sectional view of the exemplary second piston rod portion 43 shown in FIG. 4B, shows second opening 48b including a plurality of holes having angled sidewalls. In the case of angled sidewalls, an axis of openings may be angled with respect to a radial direction of piston rod 40. For example, as shown in FIG. 4C, an axis of a hole of second opening 48b may form an angle greater than 0 relative to a radially normal direction of second piston rod portion 43. Openings including angled sidewalls may be useful to impart swirl onto fluid flows entering cylinder 12 and may affect flow characteristics. First opening 44 and second opening 48 may be similarly formed.

A wall thickness of piston rod 40 may be varied along axis A. For example, as shown in FIG. 5, piston rod 40 may have thicker sidewalls in a region of first opening 44 or second opening 48. Sidewalls that are thicker in a region of the openings as compared to other parts of piston rod 40 may be advantageous for alleviating stress concentrators at or near the openings. Furthermore, thicker sidewalls may improve fatigue strength of piston rod 40 without substantially increasing weight.

Piston rod 40, together with piston 50, may be configured to move in a linear reciprocating motion in cylinder 12. Piston 50 may be configured to slide within cylinder 12 past a plurality of positions. Due to back and forth motion of piston rod 40, first opening 44 and second opening 48 may selectively communicate fluid flow from outside cylinder 12 to inside cylinder 12. First opening 44 may be arranged on piston rod 40 such that first opening 44 is configured to move into and out of first combustion chamber 71 to selectively communicate gas to first combustion chamber 71. Similarly, second opening 48 may be arranged on piston rod 40 such that second opening 48 is configured to move into and out of second combustion chamber 73 to selectively communicate gas to second combustion chamber 73.

In accordance with some embodiments of the disclosure, sliding action of the piston may enable gases to be introduced into cylinder 12, while gases on opposite sides of piston 50 may be prevented from being exchanged with one another. For example, a piston ring circumscribing piston 50 may prevent leakage of compressed gases past piston 50.

In some embodiments, the cylinder head on each side of the engine block may include (e.g., be connected to or integrally formed with) an intake manifold (not shown). In some embodiments, only one cylinder head may include an intake manifold. Passageway 46 may be configured to communicate gas flow between first combustion chamber 71 and the intake manifold at the first end of cylinder 12 when piston 50 is in a first position. Furthermore, passageway 46 may be configured to communicate gas flow between second combustion chamber 73 and the intake manifold when piston 50 is in a second position. Thus, for example, with reference to FIG. 5, gases from area 65 may enter cylinder 12 as second opening 48 bridges cylinder head 14. With reference to FIG. 10, gas from area 65 may enter cylinder 12 as first opening 44 bridges cylinder head 14.

A cylinder in accordance with embodiments of the disclosure may be closed at both ends. For example, cylinder 12 of engine 10 may be closed at both ends thereof by cylinder heads 14 and 15, which may be connected to the cylinder 12 by a plurality of fasteners. As used herein, the term "closed" does not require complete closure. For example, despite that the cylinder heads may have openings therein through which piston rod 40 passes, the cylinder heads are still considered "closed" within the meaning of this disclosure.

In some embodiments, a peripheral portion of cylinder 12 may be provided with cooling fins (not shown). Alternative configurations of the engine 10 may include other external or internal features that assist with the cooling of the cylinder, such as water passageways formed internally within the cylinder walls or jacketing at least portions of the cylinder walls for water cooling, and other configurations of cooling fins or other conductive or convective heat transfer enhancement features positioned along the exterior of a cylinder peripheral wall to facilitate fluid cooling of the cylinder. Engine block 8 may include fluid passage 21 that may be used for circulating cooling water to a peripheral sidewall of cylinder 12. Fluid passage 21 may communicate with fluid port 5 (see FIG. 1). Engine block 8 may further include fluid passage 22 that may be used for circulating cooling water to cylinder heads 14 and 15. Fluid passage 22 may communicate with fluid port 6. A temperature of cooling water in fluid passage 22 may be greater than that of fluid passage 21.

In accordance with exemplary embodiments of the disclosure, peripheral wall 13 of cylinder 12 may include at least one exhaust port between ends of cylinder 12. By way of example only, cylinder 12 may include an exhaust port 18 in a peripheral side wall of cylinder 12 between first cylinder head 14 and second cylinder head 15, the first and second cylinder heads 14, 15 being positioned at ends of the cylinder. In the exemplary embodiment illustrated in FIGS. 5-14, a plurality of distributed exhaust ports 18 may be spaced about the circumference of cylinder 12 at or approximately near a midpoint of cylinder 12 between the opposite ends of the cylinder. Exhaust ports 18 may be of any suitable size, shape, and distribution so as to accomplish the function of exhausting gases from the cylinder. One or more of the exhaust ports may, for example, be located in an axial central region of the cylinder peripheral wall, as illustrated in the figures. Although an exemplary embodiment shown in the figures is configured symmetrically, with exhaust ports 18 located midway between the opposite ends of cylinder 12, alternative embodiments may position the exhaust ports at one or more radial planes intersecting the cylinder peripheral wall at locations other than the exact midway point between cylinder heads 14 and 15.

Figure 8:
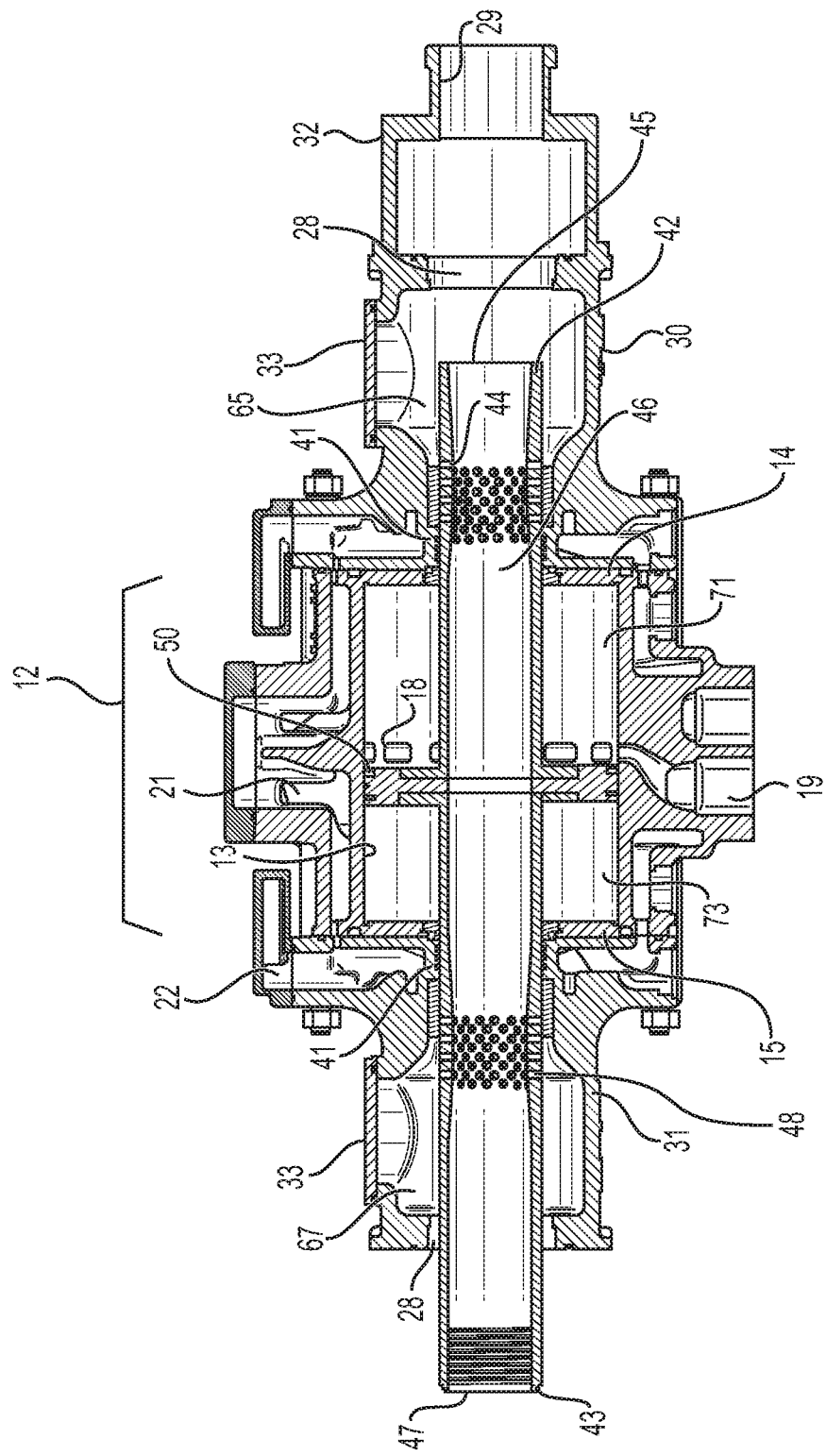
FIG. 8 is a cross-sectional view of the engine of FIG. 1 with the piston in a momentum portion of the stroke, in an early stage of compressing gasses on the left side of the cylinder, in accordance with embodiments of the present disclosure.

In accordance with some exemplary embodiments of the disclosure, one or more exhaust ports 18 may be configured to communicate gas flow between the first combustion chamber and outside the cylinder when piston 50 is on the second combustion chamber side of the one or more exhaust ports 18, and may be configured to communicate gas flow between the second combustion chamber and outside the cylinder when the piston is on the first combustion chamber side of the one or more exhaust ports 18. By way of example only, this can occur when, as illustrated in FIG. 8, piston 50 is located to the left of one or more exhaust ports 18, enabling conveyance of gas flow through the one or more exhaust ports 18 from the combustion chamber to the right of piston 50. The one or more exhaust ports 18 enable gas flow to a location "outside" the combustion chamber. That outside location may be on the side of the cylinder as illustrated, or conduits 19 associated with the engine might deliver the gases to other locations. In some embodiments, conduits 19 may be connected to an exhaust manifold (not shown).

With reference to FIG. 5, an inlet manifold, which may include vestibules for communicating gases, such as air, may be connected to or formed integrally with each of cylinder heads 14, 15 at opposite ends of cylinder 12. For example, first vestibule 30 may be formed at a first end on a side of cylinder 12, and second vestibule 31 may be formed at a second end on the opposite side of cylinder 12. Each of vestibules 30 and 31 may include a piston rod opening, such as opening 28, which is axially aligned with axis A, and side opening 33, or other openings. Side opening 33 may be positioned at a distal end of the inlet manifold, as shown, or at any location along the outer periphery of the inlet manifold. As shown in FIG. 5, side opening 33 may be sealed. Furthermore, first vestibule 30 and second vestibule 31 may each include a bushing 41. Bushings 41 may be provided for aligning, supporting, guiding, and sealing (by, e.g., means of a dedicated seal) an end of first and second piston rod portions 42, 43 while allowing first and second piston rod portions 42, 43 to slide in and out of a respective opening 28. In some embodiments, side opening 33 may be opened to allow inlet air to enter.

In some embodiments, an inlet chamber 32 may be provided for allowing inlet air to enter engine 10. For example, as illustrated in FIG. 5, inlet chamber 32 may be arranged adjacent to first vestibule 30. Passageway 46 may be configured to deliver gas from inlet chamber 32 to cylinder 12. Gas may be delivered from inlet chamber 32 to second combustion chamber 73 in the first position of piston 50, as shown in FIG. 5, and gas may be delivered from inlet chamber 32 to first combustion chamber 71 in the second position of piston 50, as shown in FIG. 10. Inlet chamber 32 may include inlet opening 29. Inlet opening 29 may be configured to direct inlet gases, such as air, into the inlet manifold in a direction along axis A. Inlet opening 29 may be configured to direct gases into passageway 46 substantially through opening 45 in first piston rod portion 42. Although the inlet manifold of the exemplary embodiment shown in FIG. 5 is illustrated as having a substantially cylindrically-shaped configuration, alternative embodiments may provide one or more inlet manifolds with other shaped profiles or cross sections, or may incorporate the inlet manifolds at least partially within cylinder heads 14, 15 as one or more internal passageways defined within each of the cylinder heads at each end of cylinder 12. Inlet opening 29 may include a substantially cylindrical member connected to inlet chamber 32 along axis A, among other configurations.

Supplying air from one end of engine 10 through inlet chamber 32 may provide a number of benefits. For example, air may be directed to flow into engine 10 substantially in a direction parallel to axis A, which may be in a longitudinal direction of engine 10. Piston rod 40 may include opening 45 and passageway 46, which is arranged to extend substantially along axis A, and thus, air may flow through piston rod 40 with less turbulence, which may reduce pressure losses. Furthermore, regions of stagnation may be minimized. As compared with providing air entering through side opening 33, for example, providing inlet chamber 32 may result in improved flow characteristics.

Air may be introduced into engine 10 through a vestibule among first vestibule 30 and second vestibule 31. Air may be configured to flow from area 65 or area 67 (external to cylinder 12) to an interior of cylinder 12, including first combustion chamber 71 or second combustion chamber 73. Air may be introduced into engine 10 through inlet chamber 32 via a vestibule among first vestibule 30 and second vestibule 31. For example, when piston 50 is in the first position, air may travel through inlet opening 29, and then air may be in communication with area 65, passageway 46, and second combustion chamber 73, as shown in FIG. 5. Also, when piston 50 is in the second position, air may travel through inlet opening 29, and then air may be in communication with area 65, first combustion chamber 71, passageway 46, and area 67.

Engine 10 may include a first isolation area on one side of cylinder 12 and a second isolation area on an opposite side of cylinder 12. The first isolation area may include area 65, and the second isolation area may include area 67. The first and second isolation areas may be configured to isolate non-active piston rod parts during alternate cylinder charges. For example, when piston 50 is in the first position, air may travel from inlet opening 29, through passageway 46, and into second combustion chamber 73, as shown in FIG. 5. In the position as shown in FIG. 5, air from inlet 29 may not be in communication with area 67. Thus, area 67 may isolate a portion of piston rod 40. A non-active part of piston rod 40 may refer to a portion through which gases do not travel to reach a combustion chamber.

Air may be supplied to engine 10 through a single air supply. The air supply may be flow-connected to passageway 46 in piston rod 40 such that gas flow is communicated between first combustion chamber 71 and the air supply when piston 50 is in the first position. Furthermore, passageway 46 may be configured to communicate gas flow between second combustion chamber 73 and the air supply when piston 50 is in a second position. It is understood that air may be introduced into engine 10 by openings other than inlet opening 29. For example, air may be introduced via one or more of side openings 33. Air may be introduced through side opening 33 in first vestibule 30 while other openings (such as inlet opening 29) are sealed off. Thus, gas may be delivered from first vestibule 30 to cylinder 12. Alternatively, air may be introduced through side opening 33 in second vestibule 31 while other openings are sealed off. Side opening 33 may be configured such that air is directed to flow into engine 10 substantially in a direction perpendicular to axis A. Side opening 33 may be configured to direct gases into passageway 46 substantially through first opening 44, or through second opening 48. Configuring openings to introduce air into engine 10 by way of, e.g., inlet opening 29, or side opening 33, may allow design flexibility in consideration of packaging constraints. For example, in some embodiments, when air is introduced through inlet opening 29, engine 10 may be packaged into a long, thin space. In other embodiments, when air is introduced through side opening 33, engine 10 may be packaged into a short, compact space.

In some embodiments, both first vestibule 30 and second vestibule 31 may be configured to supply air to engine 10. For example, both side opening 33, provided on first vestibule 30, and side opening 33, provided on second vestibule 31, may be opened. The single air supply may supply air to both first vestibule 30 and second vestibule 31.

Each of the cylinder heads 14, 15 may further include an injector 34 (see FIG. 1) that opens into an annular or toroidal-shaped recess 36 formed in or contiguous with a flame face of a fire deck of each cylinder head at each end of the cylinder 12 in facing relationship with the combustion chambers at each end of cylinder 12 (see FIG. 3). Recess 36 may be toroidal and may impart swirl flow to fuel gas injected by injectors 34 to facilitate more complete combustion of the gases within the combustion chambers. Each of cylinder heads 14, 15 may also include a cavity for accommodating and mounting a spark plugs 38. Each of cylinder heads 14, 15 may also include a cavity for accommodating and mounting bushings 41 for aligning, supporting, guiding, and sealing (by, e.g., means of a dedicated seal) a respective one of piston rod portions 42, 43 that is supported by, and passes through each of the cylinder heads 14, 15 at opposite ends of the cylinder 12. This is one example of how piston rod portions may extend from faces of a double-faced piston through a combustion chamber. Regardless of the particular details of any aperture through which the piston rods may extend at ends of the cylinder, a piston rod that extends to at least an end of the cylinder is said to extend through a combustion chamber within the meaning of this disclosure.

A double-faced piston consistent with embodiments of the present disclosure may be configured to travel in a first stroke from a first end of the cylinder to an opposite second end of the cylinder, and in a second stroke from the second end of the cylinder back to the first end. This length of travel is illustrated, by way of example, in FIGS. 5-14, where FIG. 5 represents the beginning of a first stroke, FIG. 10 represents the end of the first stroke, which may also be the beginning of a second stroke, and FIGS. 6-9 represent exemplary intermediate positions. FIG. 10 may represent the beginning of the second stroke, FIG. 14 may represent the end of the second stroke, and FIGS. 10-12 may represent some exemplary intermediate positions.

Piston 50 may be slidable between a plurality of positions throughout cylinder 12. For example, piston 50 may be slidable between a first position and a second position. The first position may be a position where first opening 44 is outside cylinder 12 and second opening 48 is inside cylinder 12. At the first position, second opening 48 may be inside the second combustion chamber of cylinder 12. The second position may be a position where first opening 44 is inside cylinder 12 and second opening 48 is outside cylinder 12. At the second position, first opening 44 may be inside the first combustion chamber of cylinder 12. The first position may correspond to the beginning of a first stroke of engine, and the second position may correspond to the end of the first stroke.

According to various exemplary embodiments of the present disclosure, the piston may be sized relative to the cylinder to enable an expansion stroke portion of each stroke wherein the piston travels under gas expansion pressure, and a momentum stroke portion of each stroke for the remainder of the stroke following the expansion stroke portion. The expansion stroke portion of each of the first and second strokes of the piston is the portion of travel when the piston directly moves under the expansion pressure of combustion. For example, the expansion portion of a stroke may be defined as the portion from a combustion position of the piston at each end of the cylinder to the point at which exhaust gases may be exchanged between the combustion chamber in which ignition of combustion gases (including air and fuel) has just occurred and an area external to the cylinder. In some embodiments, the termination of the expansion stroke portion may coincide with a position where the piston begins to expose an exhaust port.

At the combustion position of the piston during each stroke, a clearance volume may remain between each of the opposite faces of the piston and a respective end of the cylinder as closed off by the cylinder heads 14, 15. The combustion gases that are introduced into the combustion chamber before the piston reaches the combustion position may be compressed into the remaining clearance volume on that side of the piston between the piston face and the fire deck of the cylinder head. The compressed gasses in the clearance volume may be compressed into such a small volume that gas pressure prevents piston 50 from contacting a respective one of cylinder heads 14, 15. The compressed gases, which in some embodiments may include a fuel/air mixture, may be ignited by either a spark, or by self-ignition resulting at least in part from the compression of the combustion gases.

The combustion position may be a point along axis A corresponding to the beginning of a combustion event in cylinder 12. The combustion position may be a point where a predetermined compression ratio of gases in a combustion chamber is reached. For example, the combustion position may be a point where a compression ratio of a combustion chamber reaches 10:1. Combustion may be initiated at the combustion position by activating spark plug 38. The combustion position may be a point where piston 50 changes direction. The combustion position may be a zero-speed position of piston 50. In some embodiments, engine 10 may be configured so that piston 50 decelerates to zero-speed at the moment that combustion is initiated. The combustion position may correspond to the first position mentioned above, which may correspond to the beginning of the first stroke of engine 10. In some embodiments, the combustion position may be a fixed position. However, it will be understood that the combustion position may be a variable position that may be determined, for example, by when spark plug 38 is activated, or when auto-ignition is configured to occur.

The expansion stroke portion of each stroke occurs after the ignition of the compressed combustion gases as chemical energy from the combustion in each combustion chamber is converted into kinetic energy (e.g., mechanical work) of the piston. Simultaneously with the expansion stroke portion of each stroke on one side of the piston, gas flow may occur for at least a portion of the expansion stroke portion between the combustion chamber on the opposite side of the piston and the intake manifold at the opposite end of the cylinder, as well as through exhaust ports.

In some embodiments, useful work may be extracted from engine 10 by, for example, mechanically coupling one end of piston rod 40 to an output. Second piston rod portion 43 may be connected to an apparatus at an end opposite piston 50 that may be configured to convert reciprocating linear motion to useful work. For example, a linear actuator may be coupled to second piston rod portion 43 at opening 47 (see, e.g., FIG. 5). Plug 49 may be integral with an actuator configured to convert linear motion to work. Such an actuator may include a generator, for example.

Referring back to FIG. 5, at the beginning of an expansion stroke portion of a stroke where piston 50 moves from the right end of cylinder 12 to the left end, piston 50 may be in a first position. From this first position, gas flow may occur between the combustion chamber on the left side of piston 50 and inlet chamber 32, which may be on the right side of cylinder 12. Also from this first position, gas flow may also occur between the combustion chamber on the left side of piston 50 and conduits 19 leading to an outside of cylinder 12 through one or more exhaust ports 18. The communication of gases between the combustion chamber on the left side of piston 50 and conduits 19 may continue until the left face of piston 50 has moved past the one or more exhaust ports 18, acting as an exhaust valve and shutting off communication between the left combustion chamber and the one or more exhaust ports 18. Additionally, before piston 50 has closed off the one or more exhaust ports 18, second opening 48 closest to the left face of the piston may have moved outside of the left combustion chamber, thereby closing off communication of gases between inlet chamber 32 and the left combustion chamber through passageway 46 of piston rod 40. Thus, piston rod 40 may be configured such that a gas intake phase in a combustion chamber of cylinder 12 ends before an exhaust phase. A length from a proximal face of piston 50 to a proximal end of second opening 48 may be set such that fluid communication between second opening 48 and interior of cylinder 12 is stopped before fluid communication between exhaust ports 18 and interior of cylinder 12. For example, a length from the left face of piston 50 to the right end of second opening 48 may be set to be greater than a length of piston travel in the expansion phase. The length from the left face of piston 50 to the right end of second opening 48 may be greater than the length of piston travel in the expansion phase by at least a quarter of the length of piston 50. Lengths may be set to control, for example, a pressure buildup in passageway 46, as will be discussed later.

Figure 6:
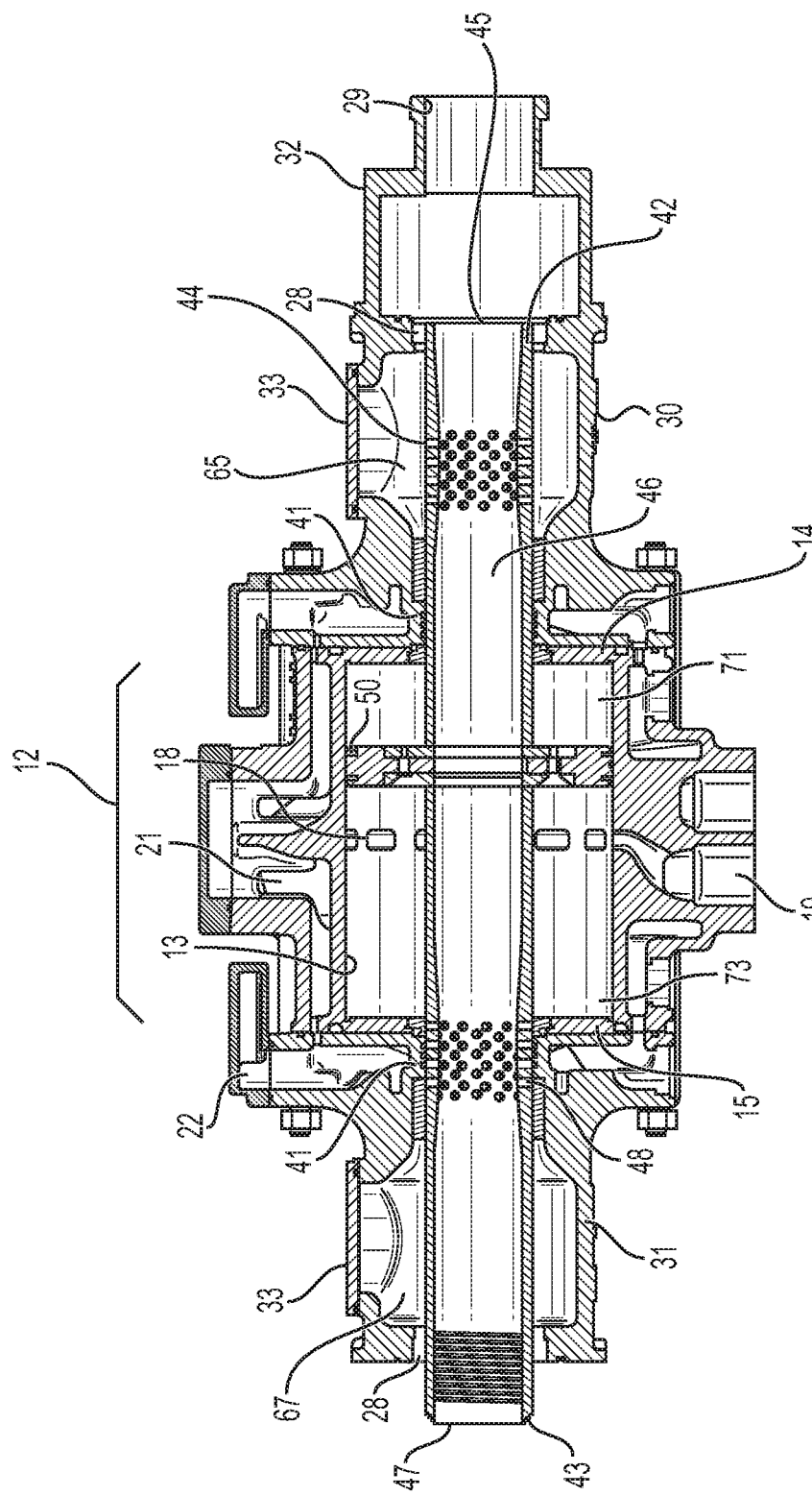
FIG. 6 is a cross-sectional view of the engine of FIG. 1 with the piston in an expansion portion of a stroke from the right side of the cylinder to a left side of the cylinder, in accordance with embodiments of the present disclosure.

As shown in FIG. 6, piston 50 may move to a further position. At the position shown in FIG. 6, second opening 48 is no longer inside cylinder 12, and thus, fluid communication between passageway 46 of piston rod 40 and the interior of cylinder 12 via second opening 48 is stopped.

According to some embodiments, a length (in axial direction A) of piston 50, a length of cylinder 12, a location of exhaust ports 18, and a location of first and second openings 44, 48 in first and second piston rod portions 42, 43 may be arranged such that when piston 50 is in a combustion phase in the first combustion chamber, piston 50 blocks exhaust ports 18 from communicating with the first combustion chamber and first opening 44 in first piston rod portion 42 is outside of the first combustion chamber, while simultaneously exhaust ports 18 are in fluid communication with the second combustion chamber, and second opening 48 in second piston rod portion 43 is within the second combustion chamber. This may be accomplished by various alternative structures. By way of example only with reference to the figures, the length of piston 50, the length of cylinder 12, the location of exhaust ports 18, and the location of openings 44 and 48 in each of first and second piston rod portions 42, 43 extending from opposite faces of piston 50 may be arranged such that when piston 50 is in a combustion phase in a first combustion chamber on one side of piston 50, piston 50 blocks exhaust ports 18 from communicating with the first combustion chamber. First opening 44 to the one side of piston 50 remains outside of the first combustion chamber, thereby preventing communication of gases between inlet chamber 32 on that one side of piston 50 and the first combustion chamber.

Simultaneously, exhaust ports 18 are in fluid communication with the second combustion chamber on the opposite side of piston 50, and second opening 48 in second piston rod portion 43 may be located within the second combustion chamber. Similarly, when piston 50 is in another combustion stage in the second combustion chamber on the opposite side, piston 50 blocks exhaust ports 18 from communicating with the second combustion chamber. Second opening 48 to the second side of piston 50 remains outside of the second combustion chamber, thereby preventing communication of gases between inlet chamber 32 on the second side of piston 50 and the second combustion chamber. Simultaneously, exhaust ports 18 are in fluid communication with the first combustion chamber on the first side of piston 50, and first opening 44 in first piston rod portion 42 may be located within the first combustion chamber.

According to some embodiments, the length of piston 50, a length of cylinder 12, a location of exhaust ports 18, and a location of first and second openings 44, 48 in first and second piston rod portions 42, 43 may be arranged such that when piston 50 continues to move through the first stroke, the combustion phase ends (concurrent with exhaust phase beginning) before first opening 44 enters cylinder 12. FIG. 7 illustrates a position where combustion on the right side of piston 50 may end while an exhaust phase may begin. The precise location where combustion ends and exhaust begins on right side of piston 50 may correspond to a position where the right face of piston 50 reaches the right edge of exhaust ports 18. At this position, first opening 44 is outside cylinder 12.

Following an expansion stroke portion (also called a combustion phase), piston 50 may continue to move in a momentum stroke portion for a remainder of the stroke. The momentum stroke portion of each stroke encompasses the remaining portion of the stroke following the expansion stroke portion. In accordance with embodiments of the disclosure, substantially the entire momentum stroke portion of the second stroke on the second combustion chamber side of piston 50 may coincide with compression of gases in the first combustion chamber. That is, the momentum that follows an expansion portion of the stroke in one combustion chamber may be used to compress gasses in the other combustion chamber. This may be made possible by an engine structure where an end of an expansion in one combustion chamber may correspond with a position different from the combustion position in an opposing combustion chamber. Such an engine design may enable further piston travel following an expansion portion of the stroke. In some embodiments, the further piston travel during the momentum portion of the stroke may be at least a width of the piston. A "width" of the piston may be synonymous with a length of the piston in the direction of axis A. In some embodiments the further piston travel may be multiple times a width of the piston. In other embodiments, the further piston travel may be a fraction of the width of the piston, for example at least a half a width of the piston. In yet other embodiments, the further travel may be at least a quarter a width of the piston. Further travel of piston 50 beyond at least one of exhaust ports 18 may be referred to as piston overshoot.

During the momentum stroke portion of each stroke, gases may be exchanged between the combustion chamber where ignition of combustion gases has just occurred and an area external to cylinder 12. The exchange of gases may occur through exhaust ports formed in peripheral wall 13 of cylinder 12. The exchange of gases may be aided by introduction of air into cylinder 12 through a passageway in the piston rod portion connected to the piston and extending from a location within the at least one combustion chamber to an area external to the cylinder. By way of one example with reference to FIGS. 5-10, the positions of piston 50 and piston rod portions 42, 43 are shown during a first stroke from the far-right position of piston 50 in cylinder 12, as in FIG. 5, to the far-left position of piston 50 in cylinder 12, as in FIG. 10. FIGS. 10-14 show the positions of piston 50 and piston rod portions 42, 43 during a second stroke from the far-left position of piston 50 in cylinder 12, as in FIG. 10, to the far-right position of piston 50 in cylinder 12, as in FIG. 14. The far-left and far-right positions of piston 50 in cylinder 12 may be referred to as the combustion position for the stroke in which the combustion gases have been compressed and ignition of the gases at the beginning of a combustion phase is occurring. When piston 50 is in the far-right position, as in FIG. 5, and ignition is occurring for the combustion gases that have been compressed into a clearance volume between the right face of piston 50 and cylinder head 14 at the right end of cylinder 12, piston 50 is at the combustion position for the stroke from the right end to the left end of cylinder 12 as viewed in FIGS. 5-10. Similarly, when piston 50 is in the far left position of FIG. 10 and ignition is occurring for the combustion gases that have been compressed into a clearance volume between the left face of piston 50 and cylinder head 15 at the left end of cylinder 12, piston 50 is at the combustion position for the stroke from the left end to the right end of cylinder 12 as viewed in FIGS. 10-14.

FIG. 5 illustrates a position where piston kit 56 is at a starting point of a first stroke that may be defined as a stroke from the right end of cylinder 12 to the left end of cylinder 12. Components of piston kit 56, including first piston rod portion 42, piston 50, and second piston rod portion 43 may be joined together such that piston kit 56 travels as a unit. In the position shown in FIG. 5, a combustion phase may begin in first combustion chamber 71 on the right side of piston 50. Meanwhile, on the opposite side of piston 50, gas may be introduced into cylinder 12 through a flow path including passageway 46 in piston rod 40. For example, gas may be introduced into inlet chamber 32 via inlet opening 29. The gas may be air. The gas may be pressurized relative to ambient atmospheric pressure. First piston rod portion 42 includes opening 45, and thus, the gas from inlet chamber 32 is in fluid communication with passageway 46 of piston rod 40. Furthermore, because opening 47 in second piston rod portion 43 may be occluded by plug 49 (or by virtue of second vestibule 31 being sealed off in an air-tight manner, for example), gas is forced into cylinder 12 via second opening 48. In this position, cylinder 12 on the left side of piston 50 may begin to fill with gas. Because exhaust ports 18 are open, some gas may escape.

As combustion begins, piston 50 will move to the left. As shown in FIG. 6, piston 50 continues to move from the combustion position for the stroke from the right end of cylinder 12 to the left end of cylinder 12. FIG. 6 illustrates a position where second opening 48 in second piston rod portion 43 reaches cylinder head 15. Accordingly, introduction of gas into cylinder 12 stops.

FIG. 7 illustrates a position where the combustion phase in first combustion chamber 71 on the right side of piston 50 may end and where a compression phase in second combustion chamber 73 on the left side of piston 50 may begin. The combustion phase may end when piston 50 begins to expose exhaust ports 18 on the right side of piston 50. At the same time, an exhaust phase on the right side of piston 50 may begin. Thus, the exhaust phase may begin when first combustion chamber 71 becomes open. The compression phase may begin when piston 50 completely covers exhaust ports 18 on the left side of piston 50. Thus, the compression phase may begin when second combustion chamber 73 becomes sealed. A width of piston 50 may be equal to that of exhaust ports 18. Although in some embodiments combustion on the right side of piston 50 may end substantially simultaneously with compression beginning on the left side of piston 50, the present disclosure is not so limited. Some embodiments may allow combustion and compression phases on opposite sides of piston 50 to begin at different times. For example, a width of piston 50 may be greater than a width of exhaust ports 18, and thus, compression may begin while the combustion phase on the opposite side of piston 50 is still occurring. Similarly, a width of piston 50 may be less than a width of exhaust ports 18, and thus, the combustion phase may end before the compression phase begins on the opposite side of piston 50.

As piston 50 continues to move to the left, piston 50 may reach a position where piston 50 has just passed the centrally located exhaust ports 18, as shown in FIG. 8. At this point, exhaust ports 18 are fully exposed on the right side of piston 50. Thus, first combustion chamber 71 on the right side of piston 50 is in fluid communication with exhaust ports 18 and exhaust gases from the combustion exit the combustion chamber. Therefore, the expansion stroke portion of the stroke has ended, and the piston is continuing to travel toward the left end of cylinder 12 in the momentum stroke portion as a result of inertia remaining after the end of the expansion stroke portion.

Figure 9:
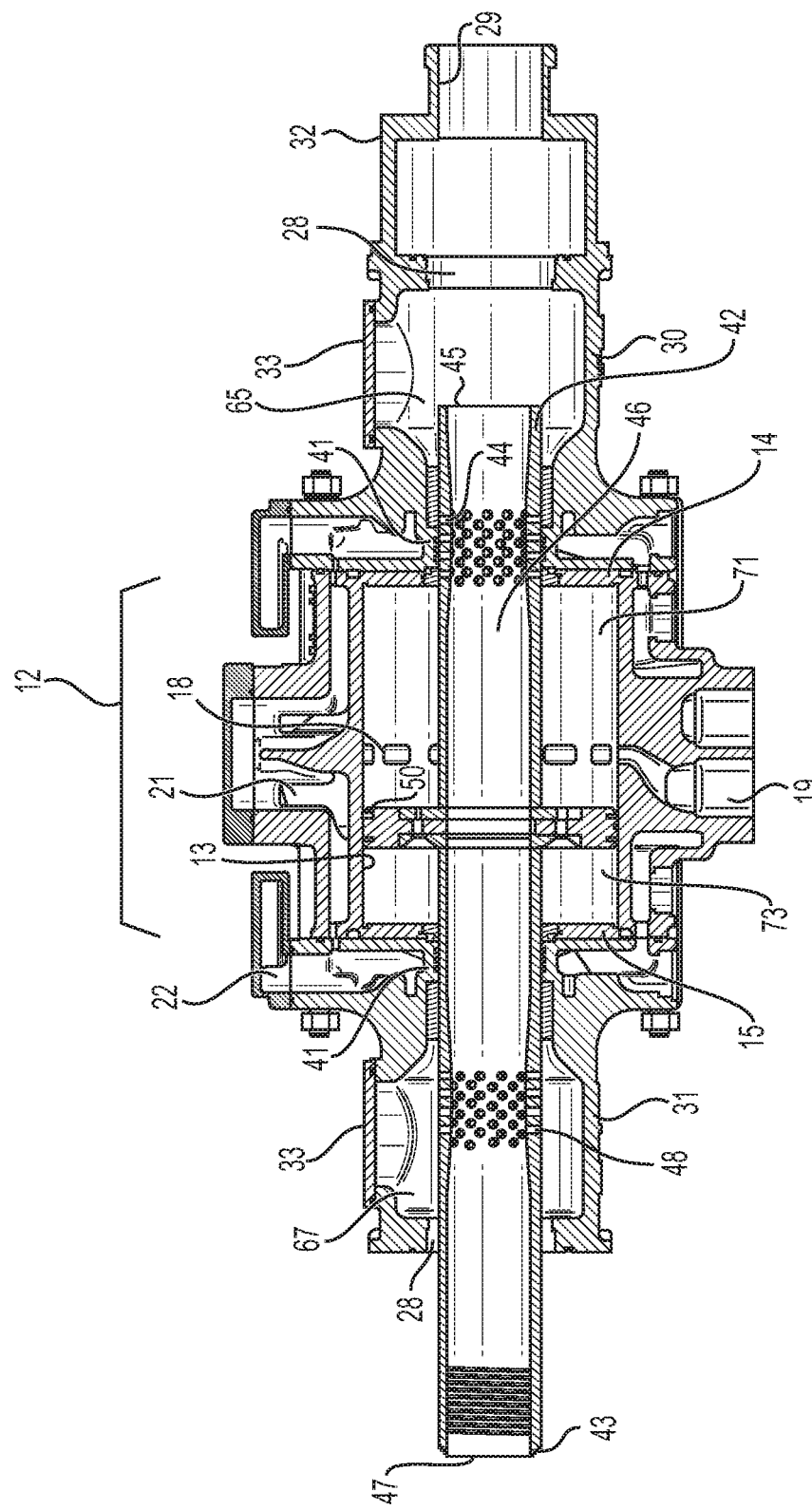
FIG. 9 is a cross-sectional view of the engine of FIG. 1 as compression continues on the left side of the cylinder beyond the compression illustrated in FIG. 8, in accordance with embodiments of the present disclosure.

As shown in FIGS. 8 and 9, piston 50, first piston rod portion 42 on the right side of piston 50, and exhaust ports 18 may be configured such that piston 50 passes all of exhaust ports 18 as the piston moves from the right end of cylinder 12 toward the left end of cylinder 12 before first opening 44 in first piston rod portion 42 enters first combustion chamber 71 on the right side of piston 50. As shown in FIG. 9, piston 50 has moved completely to the left of exhaust ports 18 by the time first opening 44 in the right piston rod portion 42 begins to enter first combustion chamber 71 on the right side of piston 50 to permit gas flow between first combustion chamber 71 and first opening 44. This relative sizing and spacing of the various components may allow exhaust gases generated in first combustion chamber 71 to begin exiting from the exhaust ports 18 before fresh pre-compressed air or other gases are introduced into first combustion chamber 71 through first piston rod portion 42 on the right side of piston 50. In various alternative embodiments, the precise placement of openings through piston rod portions 42, 43 relative to the opposite faces of piston 50 may be varied such that the closest inlet port to each face of the piston enters the respective combustion chamber on the same side of the piston shortly after the face of the piston has passed the near edge of the exhaust ports, thereby allowing exhaust gases to begin exiting the respective combustion chamber a short time before introduction of the fresh pre-compressed air or other gases (see, e.g., FIGS. 9 and 14).

Shortly after piston 50 has passed exhaust ports 18 during the momentum stroke portion of the stroke from the right end of cylinder 12 to the left end of cylinder 12, as shown in FIG. 9, the edges of first opening 44 in first piston rod portion 42 closest to the right face of piston 50 start to enter first combustion chamber 71 on the right side of piston 50. At this point, a scavenging phase may occur on the right side of piston 50 as a result of gases, such as fresh air, being introduced into first combustion chamber 71 through first opening 44 of first piston rod portion 42. Scavenging may refer to the process of pushing exhausted gas including combustion products out of cylinder 12 and drawing in fresh air for the next cycle. A certain amount of scavenging may be desired so that the next cycle does not begin with a mix of exhaust gases rather than substantially clean air. First opening 44 may be configured such that when piston 50 is in the momentum stroke portion of the first stroke from the right end to the left end of cylinder 12, gas flow may be continuously communicated between first combustion chamber 71 and an area external to cylinder 12. In the exemplary embodiment shown in FIG. 10, fresh, pre-compressed air may be introduced into first combustion chamber 71 from inlet chamber 32 located opposite cylinder head 14 or integral with cylinder head 14 on the right end of cylinder 12. Simultaneously, exhaust gases may be scavenged from first combustion chamber 71 by the incoming pre-compressed air or other gases and forced out through exhaust ports 18.

Some aspects of the present disclosure may involve cylinder 12 and piston 50 being sized such that the expansion stroke portion of the first stroke on a first side of piston 50 as piston 50 moves from the first end of cylinder 12 to the second end of cylinder 12 coincides with at least one of a scavenging phase and a gas boost phase on a second side of piston 50. A similar coincidence may occur in connection with the second stroke. By way of non-limiting example with reference to the figures, as piston 50 continues to move toward the left end of the cylinder, as shown in FIGS. 9 and 10, gas flow may be continuously communicated between first combustion chamber 71 and an area external to cylinder 12. The continuous flow of pre-compressed air or other gases introduced from inlet chamber 32 into first combustion chamber 71 may assist with cooling of cylinder 12 as well as scavenging of exhaust gases from first combustion chamber 71 and boosting the gas pressure in first combustion chamber 71. A similar coincidence is illustrated for the second stroke in FIGS. 13 and 14. In some embodiments, the coincidence of compression on one side of cylinder 12 with scavenging and gas boost on the other side of cylinder 12 may precisely correspond. In other embodiments compression on one side of cylinder 12 may substantially overlap with scavenging and gas boost on the other side of cylinder 12.

Some aspects of the present disclosure may involve cylinder 12 and piston 50 being sized such that the momentum stroke portion of the first stroke on a first side of piston 50 as piston 50 moves from the first end of cylinder 12 to the second end of cylinder 12 coincides with a compression phase in the combustion chamber on a second side of piston 50. By way of non-limiting example, simultaneously with the momentum stroke portion of the first stroke from the right end of cylinder 12 to the left end of cylinder 12, after piston 50 has moved past exhaust ports 18 toward the left end of cylinder 12, gases on the left side of piston 50 are compressed during a compression phase on the left side of piston 50. When piston 50 is all the way to the left, as shown in FIG. 10, the combustion gases on the left side of piston 50 will have been compressed into the remaining clearance volume of second combustion chamber 73 and ignition may occur to begin the second stroke.

As best seen by way of non-limiting example in FIGS. 5-14, cylinder 12 and piston 50 may be sized such that a total distance piston 50 travels during the first stroke from the right end of cylinder 12 to the left end of cylinder 12, or during the second stroke from the left end of cylinder 12 to the right end of cylinder 12, may be substantially greater than a distance piston 50 travels during the expansion stroke portion of either stroke. In some exemplary embodiments, cylinder 12 and piston 50 may be sized such that the total distance piston 50 travels during each stroke from one end of cylinder 12 to the opposite end of cylinder 12 may exceed the distance piston 50 travels during the expansion stroke portion of the stroke by at least the length of piston 50 from one face to the opposite face. In other exemplary embodiments, cylinder 12 and piston 50 may be sized such that a total distance piston 50 travels in each stroke exceeds, by at least the length of piston 50, a distance traveled by piston 50 during compression of gases on one side of piston 50. The length of the piston 50 from one face to the opposite face in the exemplary embodiment shown in the figures may be less than ½ of a distance from at least one of cylinder heads 14, 15 to centrally located exhaust ports 18. This configuration and relative sizing of the piston and cylinder may allow for a significantly greater length of the total stroke for the piston in each direction during which fresh pre-compressed air or other gases may be introduced into the cylinder for the purposes of scavenging exhaust gases and cooling the cylinder after each combustion occurs at opposite ends of the cylinder.

At the beginning of an expansion stroke portion of a stroke from the left end of cylinder 12 to the right end, as shown in FIG. 10, gas flow may occur between first combustion chamber 71 on the right side of piston 50 and inlet chamber 32 on the right side of cylinder 12, and between first combustion chamber 71 on the right side of piston 50 and exhaust ports 18. The communication of gases between first combustion chamber 71 and exhaust ports 18 may continue until the right face of piston 50 has moved past exhaust ports 18, acting as an exhaust valve and shutting off communication between first combustion chamber 71 and exhaust ports 18. Additionally, before piston 50 has closed off exhaust ports 18, first opening 44 of first piston rod portion 42 may have moved outside of first combustion chamber 71, thereby closing off communication of gases between inlet chamber 32 and first combustion chamber 71 through piston rod 40.

The length of piston 50, the length of cylinder 12, the location of exhaust ports 18, and the location of openings 44, 48 in each of the first and second piston rod portions 42, 43 extending from opposite faces of piston 50 may be arranged such that when piston 50 is in a combustion phase in second combustion chamber 73 on the left side of piston 50, piston 50 blocks exhaust ports 18 from communicating with second combustion chamber 73. Meanwhile, second opening 48 to the left side of piston 50 remains outside of second combustion chamber 73, thereby preventing communication of gases between inlet chamber 32 and second combustion chamber 73.

Simultaneously, exhaust ports 18 are in fluid communication with first combustion chamber 71 on the right side of piston 50, and first opening 44 in first piston rod portion 42 is located within first combustion chamber 71.

The momentum stroke portion of each stroke may encompass the remaining portion of the stroke following the expansion stroke portion. During the momentum stroke portion of each stroke, gases may be exchanged between the combustion chamber where ignition of combustion gases has just occurred and an area external to the cylinder. The exchange of gases may occur through exhaust ports formed in the peripheral wall of the cylinder. FIGS. 10-14 show the positions of piston 50 and piston rod portions 42, 43 during a second stroke from the far-left position of the piston in FIG. 10 to the far-right position of the piston in FIG. 14. As discussed above, the far-left and far-right positions of piston 50 in cylinder 12 may be referred to as combustion positions for the respective strokes, in which the combustion gases have been compressed and ignition of the gases at the beginning of a combustion phase may be occurring. When piston 50 is in the far-left position as in FIG. 10 and ignition is occurring for the combustion gases that have been compressed into a clearance volume between the left face of piston 50 and cylinder head 15 at the left end of cylinder 12, piston 50 is at the combustion position for the stroke from the left end to the right end of cylinder 12, as viewed in FIGS. 10-14.

Figure 11:
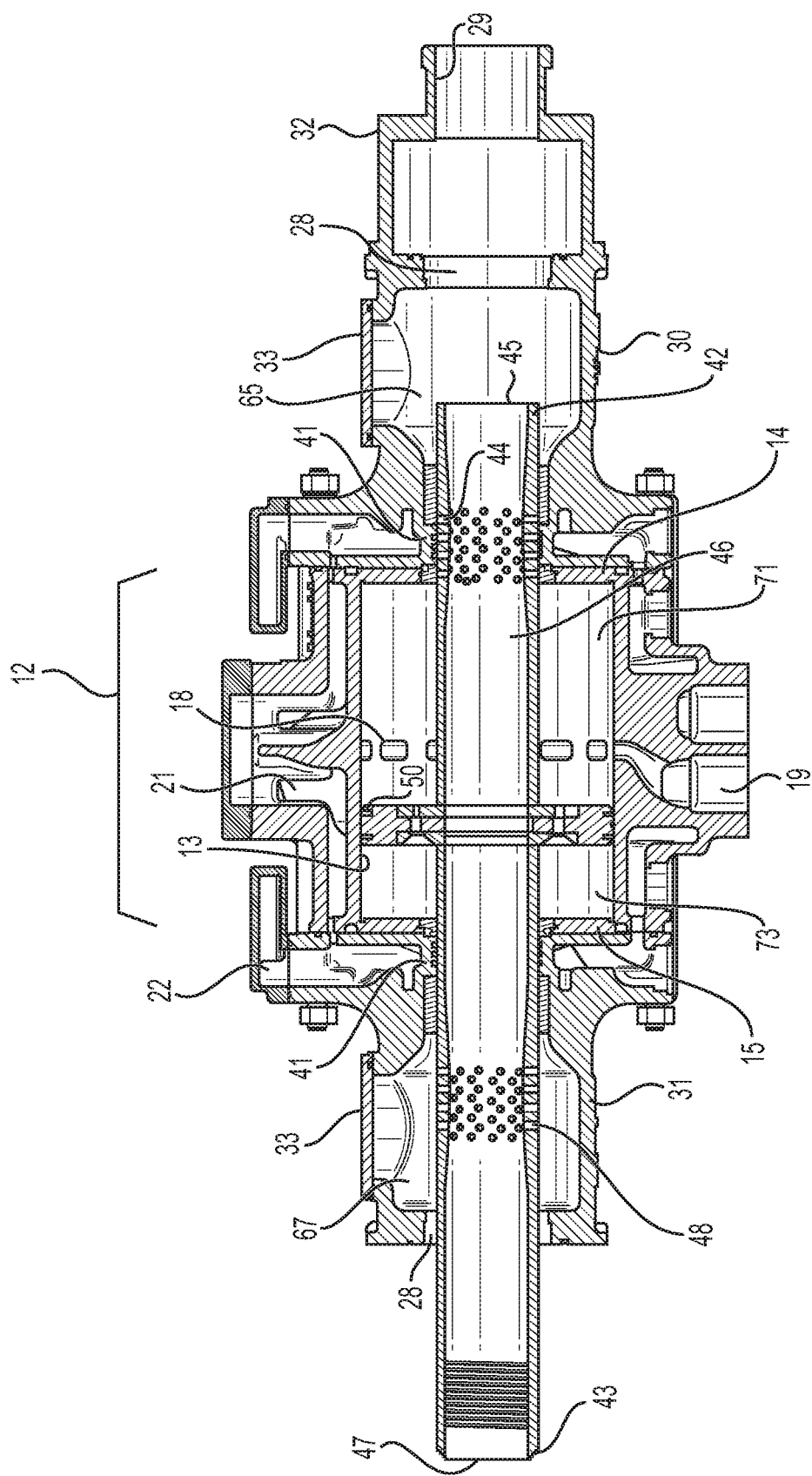
FIG. 11 is a cross-sectional view of the engine of FIG. 1 with the piston in an expansion portion of a stroke from the left side of the cylinder to the right side of the cylinder, in accordance with embodiments of the present disclosure.

As combustion begins in the second stroke, piston 50 will move to the right. As shown in FIG. 11, piston 50 continues to move from the combustion position for the stroke from the left end of cylinder 12 to the right end of cylinder 12. FIG. 11 illustrates a position where first opening 44 in first piston rod portion 42 reaches cylinder head 14. Accordingly, introduction of gas into cylinder 12 stops.

Figure 12:
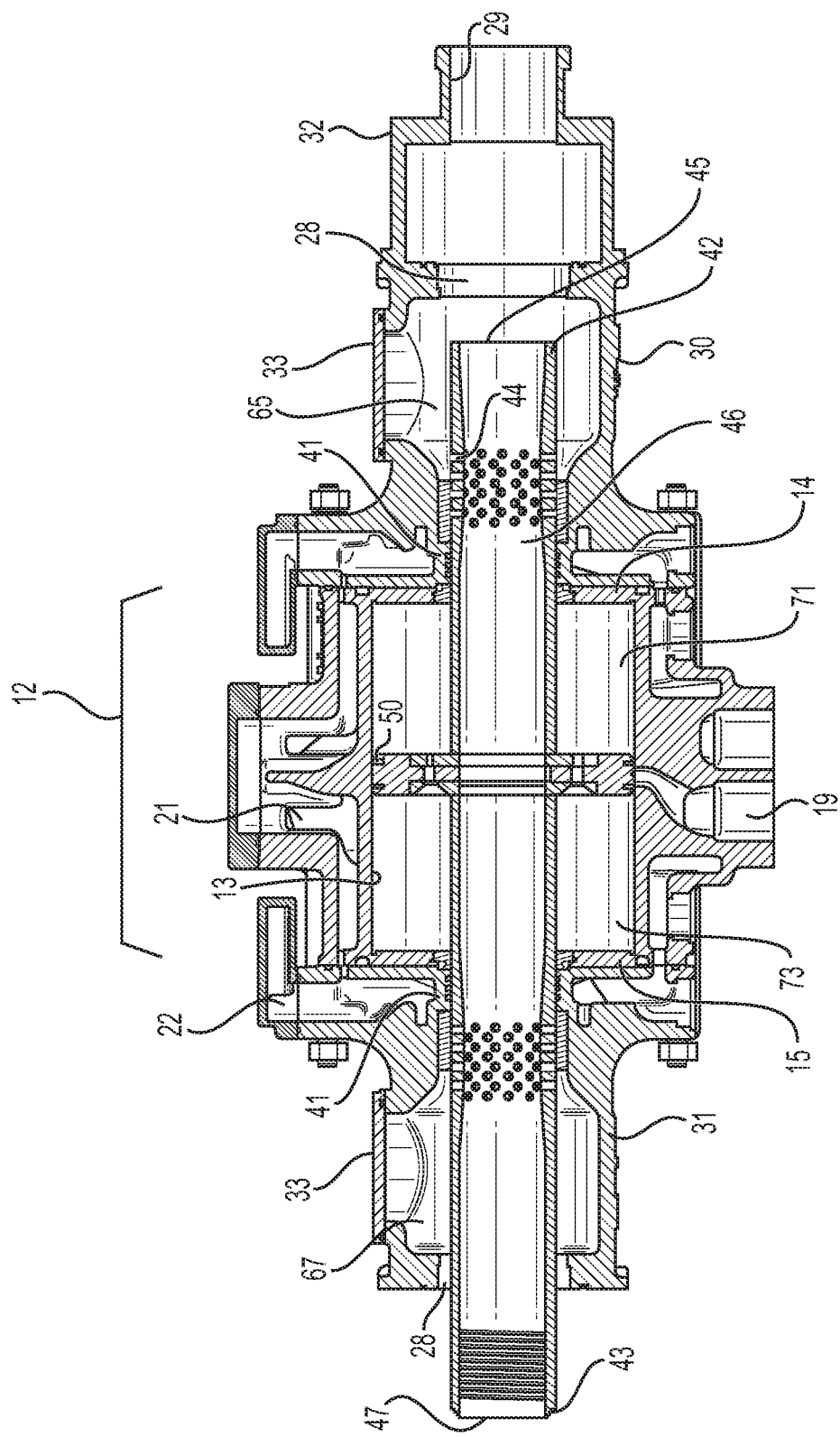
FIG. 12 is a cross-sectional view of the engine of FIG. 1 with the piston at the end of the expansion portion of the stroke from the left side of the cylinder to the right side of the cylinder, in accordance with embodiments of the present disclosure.

FIG. 12 illustrates a position where the combustion phase in second combustion chamber 73 on the left side of piston 50 may end and where a compression phase in first combustion chamber 71 on the right side of piston 50 may begin. The combustion phase may end when piston 50 begins to expose exhaust ports on the left side of piston 50. At the same time, an exhaust phase on the left side of piston 50 may begin. Thus, the exhaust phase may begin when second combustion chamber 73 becomes open. The compression phase may begin when piston 50 completely covers exhaust ports 18 on the right side of piston 50. Thus, the compression phase may begin when first combustion chamber 71 becomes sealed. According to a ratio of width of piston 50 to that of exhaust ports 18, the timing of the end of the combustion phase on the left side of piston 50 and beginning of compression on the right side of piston 50 may be adjusted.

Figure 13:
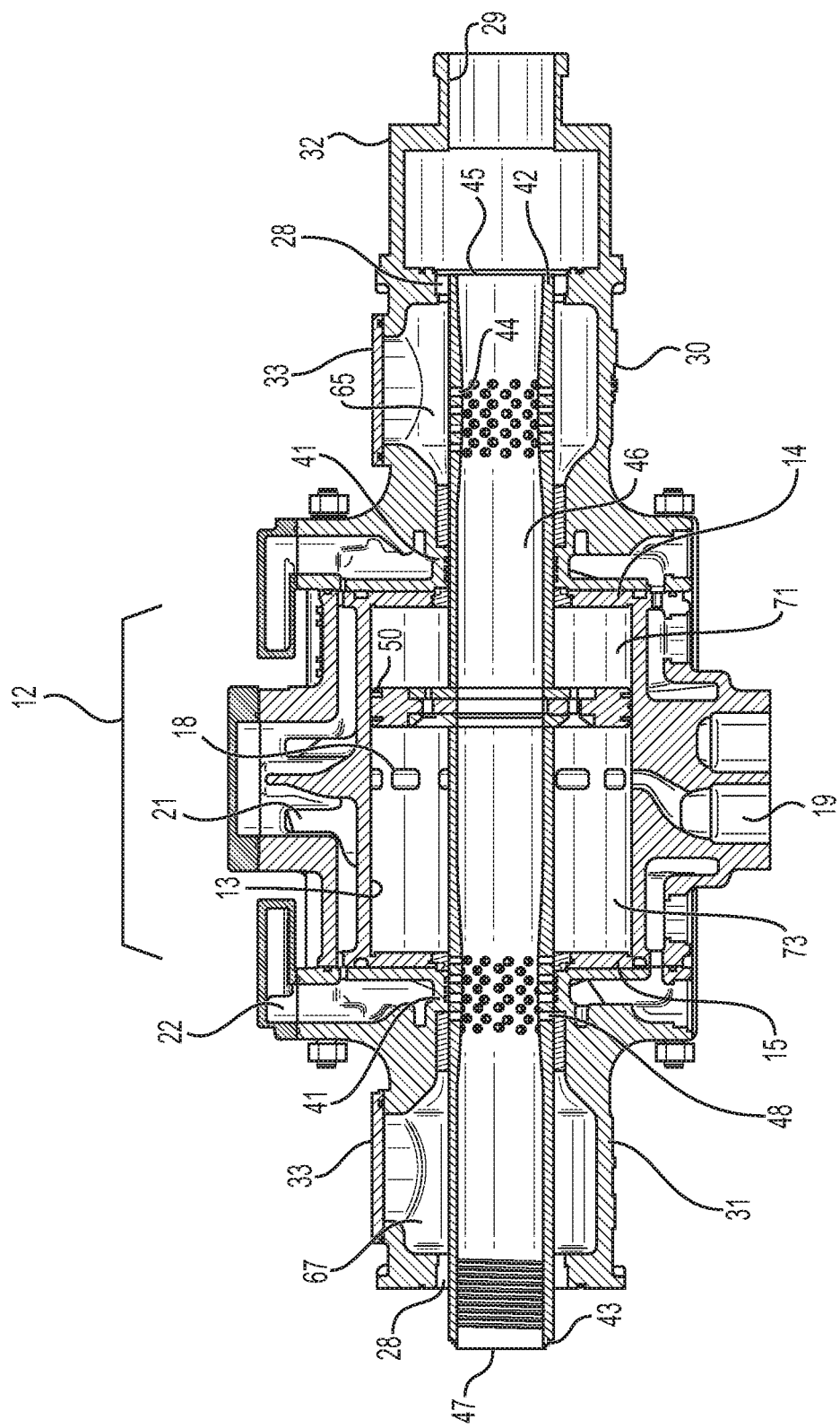
FIG. 13 is a cross-sectional view of the engine of FIG. 1 in a momentum portion of the stroke, in an early stage of compressing gasses on the right side of the cylinder, in accordance with embodiments of the present disclosure.

As the piston continues to move to the right, piston 50 may reach a position where piston 50 passes the centrally located exhaust ports 18, as shown in FIG. 13. At this point, exhaust ports 18 have been fully exposed on the left side of piston 50. Thus, second combustion chamber 73 on the left side of piston 50 is in fluid communication with exhaust ports 18 and exhaust gases from the combustion that occurred on the left side of piston 50 during the expansion stroke portion of the second stroke may exit second combustion chamber 73. Therefore, the expansion stroke portion of the second stroke has ended, and the piston is continuing to travel toward the right end of cylinder 12 in the momentum stroke portion as a result of inertia remaining after the end of the expansion stroke portion.

As shown in FIG. 13, the piston 50, second piston rod portion 43 on the left side of piston 50, and exhaust ports 18 may be configured such that piston 50 passes all of exhaust ports 18 as the piston moves from the left end of cylinder 12 toward the right end of cylinder 12 before second opening 48 in second piston rod portion 43 enters second combustion 73 chamber on the left side of piston 50. As shown in FIG. 13, piston 50 has moved completely to the right of exhaust ports 18 by the time second opening 48 in the left piston rod portion 42 begins to enter second combustion chamber 73 on the left side of piston 50 to permit gas flow between second combustion chamber 73 and second opening 48. This relative sizing and spacing of the various components may allow exhaust gases generated in second combustion chamber 73 to begin exiting from exhaust ports 18 before fresh pre-compressed air or other gases are introduced into second combustion chamber 73 through second piston rod portion 43 on the left side of piston 50. In various alternative embodiments, the precise placement of openings through piston rod portions 42, 43 relative to the opposite faces of piston 50 may be varied such that the closest inlet port to each face of the piston enters the respective combustion chamber on the same side of the piston shortly after the face of the piston has passed the near edge of the exhaust ports, thereby allowing exhaust gases to begin exiting the respective combustion chamber a short time before introduction of the fresh pre-compressed air or other gases.

Shortly after piston 50 has passed exhaust ports 18 during the momentum stroke portion of the stroke from the left end of cylinder 12 to the right end of cylinder 12, as shown in FIG. 13, the edges of second opening 48 in second piston rod portion 43 closest to the left face of piston 50 start to enter second combustion chamber 73. At this point, a scavenging phase may occur on the left side of piston 50 as a result of gases such as fresh air being introduced into second combustion chamber 73 through second opening 48 of second piston rod portion 43. Second opening 48 may be configured such that when piston 50 is in the momentum stroke portion of the second stroke from the left end to the right end of cylinder 12, gas flow may be continuously communicated between second combustion chamber 73 and an area external to cylinder 12. In the exemplary embodiment shown in FIG. 14, fresh, pre-compressed air may be introduced into second combustion chamber 73 from inlet chamber 32. Simultaneously, exhaust gases may be scavenged from second combustion chamber 73 by the incoming pre-compressed air or other gases and forced out through exhaust ports 18.

Figure 14:
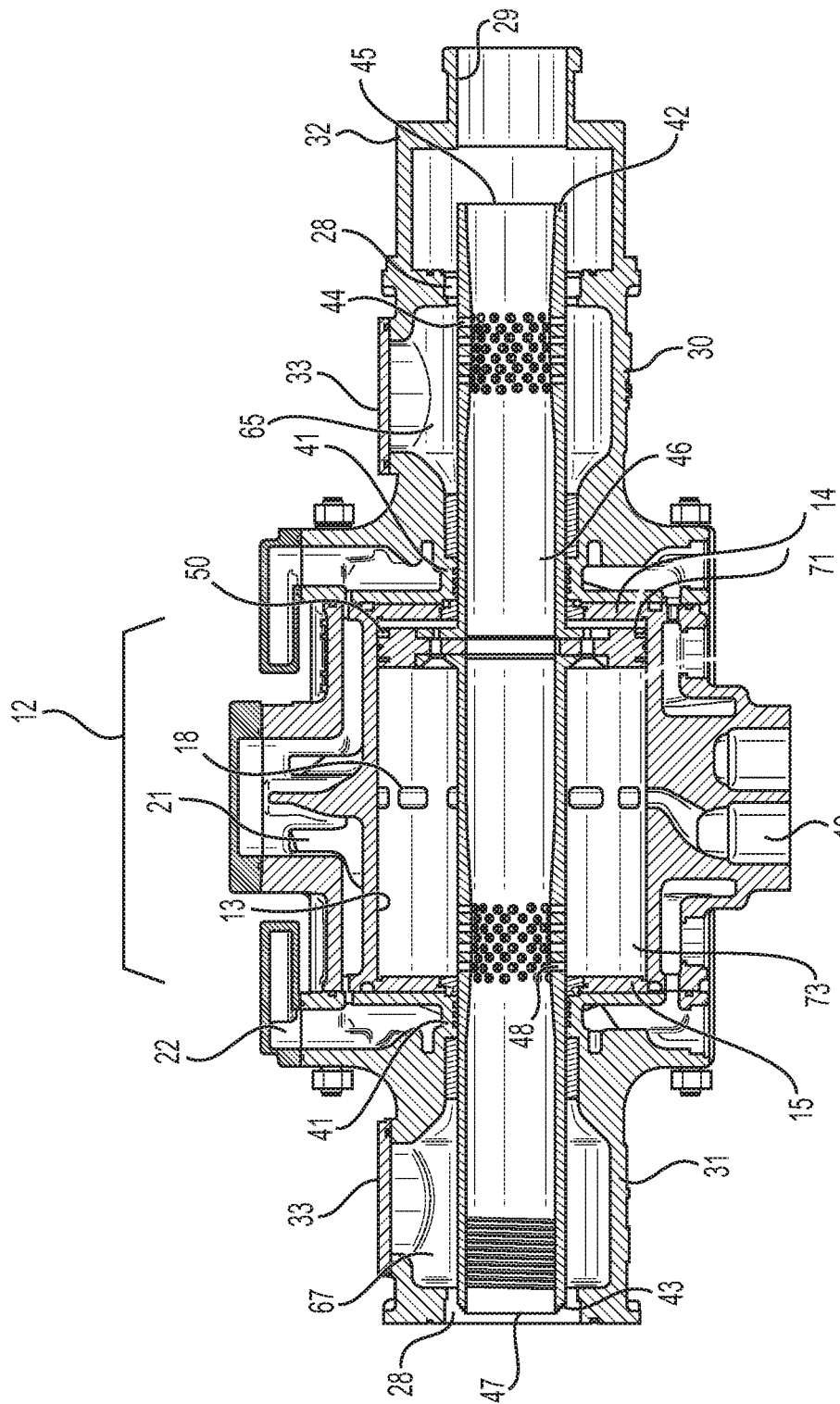
FIG. 14 is a cross-sectional view of the engine of FIG. 1 as compression continues on the right side of the cylinder beyond the compression illustrated in FIG. 13, in accordance with embodiments of the present disclosure.

As the piston continues to move toward the right end of the cylinder, as shown in FIGS. 13 and 14, gas flow may be continuously communicated between second combustion chamber 73 and an area external to the cylinder. The continuous flow of pre-compressed air or other gases introduced from inlet chamber 32 into second combustion chamber 73 may assist with cooling of cylinder 12 as well as scavenging of exhaust gases from second combustion chamber 73, and boosting the gas pressure in second combustion chamber 73. Simultaneously with the momentum stroke portion of the second stroke from the left end of the cylinder to the right end of the cylinder, after piston 50 has moved past the exhaust ports 18 toward the right end of cylinder 12, gases on the right side of piston 50 are compressed during a compression phase on the right side of piston 50. When the piston is all the way to the right, as shown in FIG. 14, the combustion gases on the right side of the piston will have been compressed into the remaining clearance volume of first combustion chamber 71 and ignition will occur to begin another stroke from the right end of the cylinder to the left end of the cylinder. Thereafter, further strokes may continue in this manner.

In accordance with some embodiments of the present disclosure, regardless of other particular structures in the engine, a cylinder and a double-faced piston may be sized such that a total distance the piston travels during a first stroke is substantially greater than a distance the piston travels during an expansion stroke portion of the first stroke. By way of example with reference to FIGS. 5-10, the total distance of piston travel may be measured from the combustion position on the right side of cylinder 12, as illustrated in FIG. 5, for example, to the combustion position on the left side of cylinder 12, as illustrated in FIG. 10, for example. This total distance traveled is substantially greater than the expansion portion of the stroke which occurs when, in the progression of FIGS. 5-10, piston 50 reaches at least one of exhaust ports 18. In some embodiments, the end of the expansion stroke may be marked by other occurrences, such as the opening of a mechanical valve, or the cessation of expansion in some other manner. Regardless of how the expansion stroke portion ends, such embodiments are contemplated to be within the scope of this disclosure so long as the total distance of travel is substantially greater than the expansion portion alone. By way of non-limiting examples, the total distance may be considered substantially greater if the difference between the expansion portion of the stroke and a non-expansion portion of the stroke is either multiple times the width of the piston, the width of the piston, greater than three quarters the width of the piston, greater than half the width of the piston, or greater than a quarter width of the piston. Thus, for example, a double-faced piston may have an axial length from one face of the piston to an opposite face of the piston that is less than or equal to ½ of a distance from at least one of the first cylinder head and the second cylinder head to an exhaust port.

In some embodiments, a cylinder and a piston may be sized such that the total distance the piston travels during each stroke from one end of the cylinder to the opposite end of the cylinder may exceed the distance the piston travels during the expansion stroke portion of the stroke by at least the length of the piston from one face to the opposite face.

In other exemplary embodiments, the cylinder and the piston may be sized such that a total distance the piston travels in each stroke exceeds, by at least the length of the piston, a distance traveled by the piston during compression of gases on one side of the piston. The length of piston 50 from one face to the opposite face in an exemplary embodiment shown in the figures may be less than ½ of a distance from at least one of cylinder heads 14, 15 to exhaust ports 18. This configuration and relative sizing of the piston and cylinder may allow for a significantly greater length of the total stroke for the piston in each direction during which fresh pre-compressed air or other gases may be introduced into the cylinder for the purposes of scavenging exhaust gases and cooling the cylinder after each combustion occurs at opposite ends of the cylinder.

In some embodiments, a cylinder and a piston may be configured such that an amount of overshoot of the piston after the end of an expansion phase may be substantially greater than the length of a compression volume. The compression volume may correspond to the clearance volume in cylinder 12 as discussed above. For example, piston 50 and cylinder 12 may be sized such that a length that piston 50 travels in a momentum stroke portion is substantially greater than the length of the clearance volume between one side of piston 50 and the closest cylinder head 14, 15 at the combustion position. In some embodiments, an amount of overshoot is at least a quarter the length of piston 50. Setting an amount of overshoot in this manner to be, for example, at least a quarter the length of piston 50, may be useful to ensure a sufficient duration for scavenging to occur in cylinder 12.

In accordance with some embodiments of the present disclosure, an internal combustion engine may include a piston kit being formed of an assembly of separate pieces, including a pair of piston rod portions and a piston comprising a disk. By way of example, and as shown in FIG. 4B, various embodiments of an engine according to the disclosure may include a double-faced piston, such as piston 50, and one or more piston rods, such as first piston rod portion 42 and second piston rod portion 43. Piston rod portions may extend from a center of the piston. For example, each of first piston rod portion 42 and second piston rod portion 43 may extend from the radial center of piston 50. Piston 50, first piston rod portion 42, and second piston rod portion 43 may thus be coaxial. Because piston 50 moves linearly along axis A, and because mechanical load may be transferred through second piston rod portion 43 that may be connected to an actuator, load may be transferred along the same axis A. Thus, substantially all forces acting on piston 50 may act in a direction parallel to axis A. Furthermore, there are no side forces acting on piston 50, i.e., forces acting in a direction perpendicular to axis A. Compared to a conventional engine with pistons connected to a crankshaft, and which experience lateral forces, piston 50 may avoid side forces acting in a direction different from the primary movement direction of the piston. Due to a lack of experiencing lateral forces, piston 50 may experience reduced stress and reduced accumulated heat, and thus, may have reduced need for cooling. In some embodiments, piston 50 may be regarded as a transverse stressless action piston. Furthermore, piston kit 56 may be substantially rotationally symmetric about axis A. Further still, in some embodiments, piston kit 56 may be symmetrical with respect to a median plane. The median plane may be a plane at an axial center of piston 50 that is perpendicular to axis A.

Engine 10 may be provided with a single air supply. The single air supply may be connected to an inlet chamber. For example, in the embodiment as shown in FIGS. 5-14, inlet chamber 32 includes inlet opening 29, which may be connected to a source that supplies air. The source that supplies air may be the only air supply provided in engine 10. It is understood that inlet chamber 32 may be provided on the left side of engine 10, as well. For example, the configuration of engine 10 shown in FIGS. 5-14 may be mirrored. Air may be supplied to inlet chamber 32 at a pressure that may be higher than atmospheric ambient pressure. When air is supplied in this manner, a design may be achieved that is compact. Furthermore, such a design may be less complex than one requiring separate air supplies.

When a single air supply is provided, inlet chamber 32 may be configured to permit fresh air to flow into both first combustion chamber 71 and second combustion chamber 73. Furthermore, in some embodiments, first vestibule 30 and second vestibule 31 may be configured as isolation areas. An isolation area may be an area external to cylinder 12 that is configured to isolate non-active piston rod parts during alternate cylinder charges. For example, first vestibule 30 may act as a first isolation area on one side of cylinder 12 and second vestibule 31 may act as a second isolation area on an opposite side of cylinder 12.

In some embodiments, multiple air supplies may be provided. For example, rather than providing inlet chamber 32, engine 10 may include two air supplies, each configured to supply air to one of first vestibule 30 or second vestibule 31. Engine 10 may include a first air supply that communicates with first vestibule 30 and a second air supply that communicates with second vestibule 31, each through a respective side opening 33. The two air supplies may be connected upstream of side openings 33. Thus, a single air supply may be bifurcated to form multiple air supplies. In this embodiment, one or both of first piston rod portion 42 and second piston rod portion 43 may include occluded ends. In such cases, additional openings may be provided in first piston rod portion 42 and second piston rod portion 43. For example, a further set of openings may be provided on first piston rod portion 42 that is spaced apart from first opening 44. The further set of openings may be configured to communicate gas from first vestibule 30 while first opening is inside cylinder 12. The further set of openings may be configured to be outside cylinder 12 when first opening 44 is inside cylinder 12. A structure of the further set of opening may be similar to that of first openings 44. Such further set of openings may be similarly provided in second piston rod portion 43.

Flow of gases within piston kit 56 may occur in different directions. In some embodiments, a passageway in a piston assembly may be configured to communicate gas flow in a first direction from a first side of the piston to a second side of the piston, and to communicate gas flow in a second direction from the second side of the piston to the first side of the piston. For example, passageway 46 may be provided in piston rod 40, wherein passageway 46 is configured to allow gas flow in a first direction from area 67 on one side of piston 50 to the inside of cylinder 12 through second opening 48. Piston 50 may be at the first position, for example at the combustion position on the right side of cylinder 12 at the time of supplying gas to cylinder 12 through second opening 48. Passageway 46 may also be configured to allow gas flow in a second direction from area 65 on the opposite side of piston 50 to the inside of cylinder 12 through first opening 44. Piston 50 may be at the second position, for example at the combustion position on the left side of cylinder 12 at the time of supplying gas to cylinder 12 through first opening 44.

In some embodiments, flow of gases within piston kit 56 may be in the same direction. For example, when inlet chamber 32 is provided, gas may flow from inlet opening 29 through passageway 46 and into cylinder 12 via second opening 48 (see FIG. 5). At another position of piston 50, gas may flow from inlet opening 29 through passageway 46 and into cylinder 12 via first opening 44 (see FIG. 10).

Figure 15:
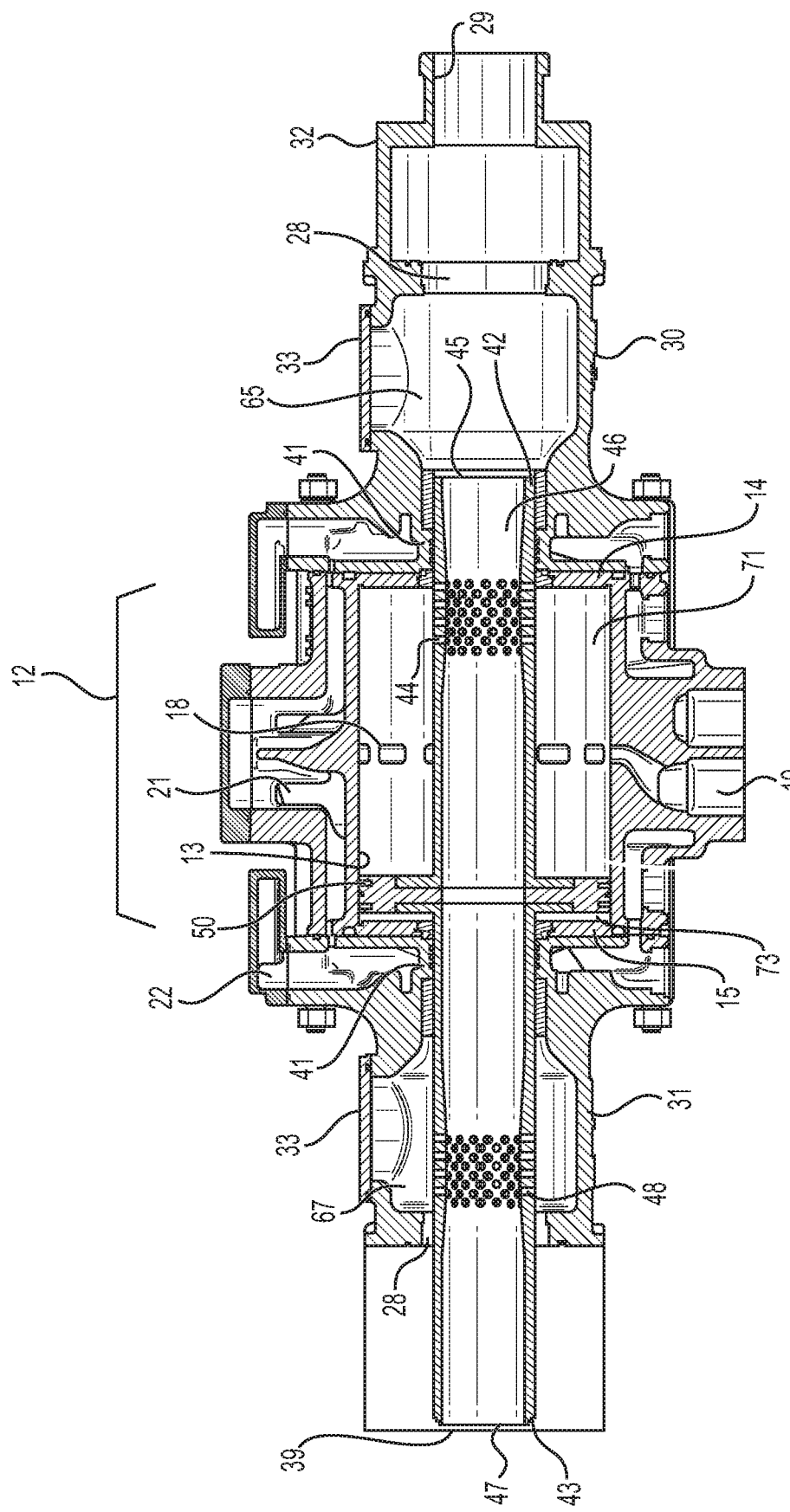
FIG. 15 is a cross-sectional view of an engine with the piston at top dead center on the left side of the cylinder, in accordance with embodiments of the present disclosure.

FIG. 15 illustrates an embodiment of engine 10 including chamber 39. The embodiment of FIG. 15 may be similar to that of FIG. 5 except that occlusion may be accomplished by chamber 39. Second piston rod portion 43 may be provided without plug 49. Chamber 39 may be a structure that is attached to or integral with second vestibule 31. Chamber 39 may be sealed in an airtight manner. When piston 50 is in the second position, as shown in FIG. 15, air may be introduced from inlet opening 29. Because the left side of engine 10 is occluded, air that is inlet to piston rod 40 may travel through passageway 46 to area 67 but does not escape to areas outside engine 10. Instead, air may be forced into cylinder 12 through first opening 44. Thus, engine 10 may function in a similar manner to that as shown in FIG. 5.

A piston rod may be configured such that the piston assembly is slidable between a position where piston rod openings are blocked and a position where at least one of piston rod openings are opened. In some positions throughout the range of travel of piston 50, there may be positions where none of first opening 44 or second opening 48 is in fluid communication with cylinder 12. For example, FIGS. 6, 7, 8, 9, 11, 12, and 13 show instances where first opening 44 and second opening 48 have not yet entered cylinder 12. A pressure buildup period may occur between, for example, the position of FIG. 6 and the position of FIG. 9. In a first pressure buildup position, such as that shown in FIG. 6, gases introduced from inlet opening 29 may be in fluid communication with passageway 46, but the gases may be unable to exit from engine 10. Thus, pressure may begin building in regions in fluid communication with inlet chamber 32, such as area 65, area 67, and inside passageway 46. Upon reaching a second pressure buildup position, such as that shown in FIG. 9, an internal pressure in regions in fluid communication with inlet chamber 32 may rise to a predetermined level. Thereafter, when first opening 44 becomes exposed to the inside of cylinder 12, pressure is released and high-pressure air may be delivered to the inside of cylinder 12. Delivery of high-pressure air into cylinder 12 may increase the amount of work that engine 10 may output. For example, high-pressure air introduced into cylinder 12 may serve to further advance piston 50 toward the left side of cylinder 12, as shown in the embodiment of FIG. 9.

An engine in accordance with exemplary embodiments of the disclosure may produce further benefits. For example, an engine may facilitate nearly continuous scavenging of hot exhaust gases from the cylinder while continuously supplying fresh air for combustion. The nearly continuously introduced fresh pre-compressed air may decrease the temperature within the cylinder and increase the engine efficiency and engine service life.

Various alterations and modifications may be made to the disclosed exemplary embodiments without departing from the spirit or scope of the disclosure. For example, the burned gases produced by the engine 10 may be used for driving a turbo charger. The compressed air introduced into the cylinder may be pressurized by an external compressor that is driven by the reciprocating piston rod portions extending from opposite ends of the cylinder. Other variations may include imparting a swirl effect to the gases introduced into the cylinder by changing the angle of the inlet ports and of the outlet ports so that gases are not directed radially into or out of the cylinder.

To expedite the foregoing portion of the disclosure, various combinations of elements are described together. It is to be understood that aspects of the disclosure in their broadest sense are not limited to the particular combinations previously described. Rather, embodiments of the invention, consistent with this disclosure, and as illustrated by way of example in the figures, may include one or more of the following listed features, either alone or in combination with any one or more of the following listed features, or in combination with the previously described features.

For example, there may be provided a linear reciprocating engine. The engine may include a cylinder having a first combustion chamber at a first end thereof and a second combustion chamber at an opposing second end thereof; a first cylinder head located at an end of the first combustion chamber; a second cylinder head located at an end of the second combustion chamber; a piston slidably mounted within the cylinder; and a piston rod including at least one piston rod portion extending through the first combustion chamber and the second combustion chamber, the at least one piston rod portion having at least one first port located on a first side of the piston and at least one second port located on a second side of the piston, opposite the first side of the piston. There may also be provided the following elements:

wherein the at least one piston rod portion includes a passageway extending through the piston configured to communicate gas flow therethrough.

wherein the piston rod is slidable to a first position where the at least one first port and the at least one second port are blocked to enable a pressure build up in the passageway.

wherein the piston rod is slidable to a second position where the at least one second port is open to release pressurized air into the second combustion chamber.

wherein the piston rod is slidable to a third position where the at least one first port is open to release pressurized air into the first combustion chamber.

Furthermore, for example, there may be provided a linear reciprocating engine including a cylinder having a first combustion chamber at a first end thereof and a second combustion chamber at an opposing second end thereof; a vestibule located external to the first combustion chamber proximate the first end; a piston slidably mounted within the cylinder; a first piston rod portion extending from the piston through the first combustion chamber and into the vestibule, the first piston rod portion including a hollow tube portion having an inlet port and at least one first sidewall opening therein; and a second piston rod portion extending from the piston through the second combustion chamber, the second piston rod portion having a hollow tube portion and at least one second sidewall opening therein. There may also be provided the following elements:

wherein the first piston rod portion is flow-connected to the second piston rod portion.

wherein the at least one first sidewall opening and the at least one second sidewall opening are positioned such that during a first stroke portion, the at least one inlet port is located in the vestibule to supply the first combustion chamber with air from the vestibule.

wherein during a second stroke portion the at least one inlet port is located in the vestibule to supply the second combustion chamber with air from the vestibule.

wherein the engine further includes a fresh air pump connected to the single air inlet.

wherein the engine further includes a pump for supplying pressurized air to the vestibule.

wherein the engine includes two combustion chambers wherein the single air inlet and piston rod are configured to permit fresh air to flow into both combustion chambers.

Furthermore, for example, there may be provided a linear reciprocating engine including a cylinder having a first combustion chamber at a first end thereof and a second combustion chamber at an opposing second end thereof; a first vestibule located external to the first combustion chamber proximate the first end; a second vestibule located external to the second combustion chamber proximate the second end; a piston slidably mounted within the cylinder; a first piston rod portion extending from the piston through the first combustion chamber and into the first vestibule, the first piston rod portion having a first elongated passageway portion therethrough and at least one first port therein; and a second piston rod portion extending from the piston through the second combustion chamber and into the second vestibule, the second piston rod portion having a second elongated passageway portion therethrough and at least one second port therein. There may also be provided the following elements:

wherein the first passageway portion flow connects to the second passageway portion.

wherein when the at least one first port is located in the first vestibule, the at least one second port is located in the second combustion chamber, thereby permitting flow communication between the first vestibule and the second combustion chamber.

wherein when the at least one second port is located in the second vestibule, the at least one first port is located in the first combustion chamber, thereby permitting flow communication between the second vestibule and the first combustion chamber.

Furthermore, for example, there may be provided an internal combustion engine including a cylinder having a first combustion chamber at a first end thereof and a second combustion chamber at an opposing second end thereof; a vestibule external to the combustion chamber; a piston slidably mounted within the cylinder; and a piston rod extending from the piston through the combustion chamber and into the vestibule. There may also be provided the following elements:

wherein the piston rod includes an opening therethrough extending to the piston, and at least one port therein.

a port in the vestibule for supplying pressurized air to the vestibule to thereby enable, during a combustion stroke of the piston, pressurized air to move through the piston rod and cool the piston.

Furthermore, for example, there may be provided a linear reciprocating engine including a cylinder having a first combustion chamber at a first end thereof and a second combustion chamber at an opposing second end thereof, the cylinder having one or more side ports therein; a first cylinder head located at an end of the first combustion chamber; a second cylinder head located at an end of the second combustion chamber; a double-faced piston slidably mounted within the cylinder; a first piston rod portion extending from the piston through the first combustion chamber and into a first pressurizable vestibule, the first piston rod portion having a first elongated passageway portion therethrough and at least one first port therein; a second piston rod portion extending from the piston through the second combustion chamber and into a second pressurizable vestibule, the second piston rod portion having a second elongated passageway portion therethrough, the second elongated passageway portion being flow connected to the first elongated passageway and at least one second port therein. There may also be provided the following elements:

wherein the at least one first port and the at least one second port are respectively arranged such that when the double-faced piston is located in a central position in the combustion chamber and the first vestibule and the second vestibule are pressurized, a static air flow condition exists in the first piston rod portion and the second piston rod portion.

What is claimed is:

1. A piston assembly, comprising:
   a piston configured to be slidably mounted within a cylinder having a first combustion chamber at a first end and a second combustion chamber at an opposing second end;
   a piston rod having an interconnecting flow passageway extending through the piston;
   at least one first opening in a first side of the piston rod configured to move into and out of the first combustion chamber to selectively communicate gas to the first combustion chamber; and
   at least one second opening in a second side of the piston rod configured to move into and out of the second combustion chamber to selectively communicate gas to the second combustion chamber,
   wherein the piston is configured such that when the first opening is outside the first combustion chamber the second opening is inside the second combustion chamber, and when the first opening is inside the first combustion chamber the second opening is outside the second combustion chamber.

2. An engine, comprising:
   a cylinder having a first combustion chamber at a first end of the cylinder and a second combustion chamber at an opposing second end of the cylinder;
   a piston slidably mounted within the cylinder;
   a piston rod having a passageway extending through the piston into both the first and second combustion chambers;
   at least one first opening in a first side of the piston rod configured to move into and out of the first combustion chamber to selectively communicate gas to the first combustion chamber; and
   at least one second opening in a second side of the piston rod configured to move into and out of the second combustion chamber to selectively communicate gas to the second combustion chamber,
   wherein the piston is slidable between a first position where the first opening is outside the first combustion chamber and the second opening is inside the second combustion chamber, and a second position where the first opening is inside the first combustion chamber and the second opening is outside the second combustion chamber, and
   wherein the passageway connects a first passageway in the piston rod on a first side of the piston to a second passageway in the piston rod on a second side of the piston.

3. An engine, comprising:
   a cylinder having a first combustion chamber at a first end of the cylinder and a second combustion chamber at an opposing second end of the cylinder;
   a piston slidably mounted within the cylinder;

a piston rod having a passageway extending through the piston into both the first and second combustion chambers;

at least one first opening in a first side of the piston rod configured to move into and out of the first combustion chamber to selectively communicate gas to the first combustion chamber; and at least one second opening in a second side of the piston rod configured to move into and out of the second combustion chamber to selectively communicate gas to the second combustion chamber, wherein the piston rod includes an open end, and the piston rod is configured to supply the first combustion chamber or the second combustion chamber with gas via the open end.

4. The engine of claim 3, wherein
the passageway is configured to communicate gas flow in a first direction from the first side of the piston through the passageway and through the second opening to the second combustion chamber on an opposite side of the piston, and to communicate gas flow in a second direction, opposite the first direction, from the second side of the piston through the passageway and through the first opening to the first combustion chamber on the first side of the piston.

5. The engine of claim 3, wherein
the passageway is configured to communicate gas flow in a first direction in the first position from the first side of the piston through the passageway and through the second opening to the second combustion chamber on an opposite side of the piston, and to communicate gas flow in the first direction in the second position through the passageway and through the first opening to the first combustion chamber.

6. The engine of claim 3, wherein the engine is configured such that gas is introduced into the piston rod substantially in a direction parallel to a longitudinal axis of the piston rod.

7. The engine of claim 3, wherein the piston rod extends from a center of the piston.

8. The engine of claim 3, wherein the piston rod is connected at a center of the piston, symmetrically with respect to a longitudinal axis of the piston rod.

9. The engine of claim 3, wherein the piston is a transverse stressless action piston.

10. The engine of claim 3, wherein the piston rod is symmetric with respect to a median plane of the piston.

11. The engine of claim 3, wherein the piston rod is asymmetric with respect to a median plane of the piston.

12. The engine of claim 11, wherein the piston rod includes a first piston rod portion and a second piston rod portion, the first piston rod portion and the second piston rod portion having different lengths.

13. The engine of claim 3, wherein the engine is provided with a single air supply.

14. The engine of claim 3, wherein the cylinder has a peripheral cylinder wall and at least one port in the peripheral cylinder wall.

15. The engine of claim 3, wherein
wherein the piston is slidable between a first position where the first opening is outside the first combustion chamber and the second opening is inside the second combustion chamber, and a second position where the first opening is inside the first combustion chamber and the second opening is outside the second combustion chamber, the piston is slidable to a third position where both the first opening and the second opening are blocked to enable a pressure buildup in the passageway, and the pressure buildup is released into the cylinder at the first position or the second position.

16. The engine of claim 3, wherein the first opening includes a plurality of holes extending through a sidewall of the piston rod.

17. The engine of claim 3, further comprising a plug configured to occlude one end of the piston rod.

18. The engine of claim 3, wherein the passageway renders the piston rod at least partially hollow.

19. The engine of claim 3, wherein the piston and the piston rod are monolithically formed.

20. The engine of claim 3, wherein the engine is a linear reciprocating engine.

* * * * *

UNITED STATES PATENT AND TRADEMARK OFFICE
CERTIFICATE OF CORRECTION

PATENT NO. : 10,968,821 B2  
APPLICATION NO. : 16/831920  
DATED : April 6, 2021  
INVENTOR(S) : Shaul Haim Yaakoby Page 1 of 1

It is certified that error appears in the above-identified patent and that said Letters Patent is hereby corrected as shown below:

In the Claims

Claim 15, Column 28, Lines 17-18, "The engine of claim 3, wherein wherein the piston is slidable between a first position" should read --The engine of claim 3, wherein the piston is slidable between a first position--.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*